United States Patent
Bisht et al.

(10) Patent No.: US 11,636,229 B2
(45) Date of Patent: Apr. 25, 2023

(54) SCALABLE APPLICATION LEVEL MONITORING FOR SDN NETWORKS

(71) Applicant: Telefonaktiebolaget LM Ericsson (publ), Stockholm (SE)

(72) Inventors: Ashutosh Bisht, Bangalore (IN); Faseela K, Bangalore (IN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 179 days.

(21) Appl. No.: 16/469,612

(22) PCT Filed: Jan. 14, 2017

(86) PCT No.: PCT/IB2017/050205
§ 371 (c)(1),
(2) Date: Jun. 13, 2019

(87) PCT Pub. No.: WO2018/130883
PCT Pub. Date: Jul. 19, 2018

(65) Prior Publication Data
US 2020/0084131 A1  Mar. 12, 2020

(51) Int. Cl.
*G06F 21/79* (2013.01)
*H04L 43/028* (2022.01)
(Continued)

(52) U.S. Cl.
CPC ............ *G06F 21/79* (2013.01); *H04L 43/028* (2013.01); *H04L 43/12* (2013.01); *H04L 45/38* (2013.01);
(Continued)

(58) Field of Classification Search
CPC ...... G06F 21/53; G06F 21/79; G06F 12/1425; G06F 12/109; G06F 12/1036; G06F 9/4406; G06F 9/45558; H04L 63/1416
See application file for complete search history.

(56) References Cited

U.S. PATENT DOCUMENTS 9,203,763 B2   12/2015  Anand et al.
9,479,522 B1 * 10/2016  Cirkovic ............. H04L 63/1416
(Continued)

FOREIGN PATENT DOCUMENTS

CA   2589161 A1   6/2006
CN  105760214 A   7/2016
(Continued)

OTHER PUBLICATIONS

Brockners, F., "Next-gen Network Telemetry is Within Your Packets: In-band OAM," Cisco, Open Networking Summit, Apr. 3-6, 2017, downloaded from https://events.static.linuxfound.org/sites/events/files/slides/In-band_OAM.pdf on Jun. 4, 2019, pp. 1-64.
(Continued)

*Primary Examiner* — Kyung H Shin
(74) *Attorney, Agent, or Firm* — Sage Patent Group

(57) ABSTRACT

A method is implemented by a network device to reduce bandwidth and compute resources needed by the controller of a software defined networking (SDN) controller by distributing monitoring of virtual network functions (VNFs) to data plane nodes (DPNs) in a SDN network. The method includes receiving a monitoring request from the SDN controller to monitor a VNF, receiving a byte sequence from the SDN controller for the VNF, and generating flow table entries for monitoring the VNF by matching the byte sequence with monitoring response messages from the VNF.

17 Claims, 12 Drawing Sheets

(51) Int. Cl.
  *H04L 43/12* (2022.01)
  *H04L 45/00* (2022.01)
  *H04L 45/64* (2022.01)
  *H04L 9/40* (2022.01)
  *G06F 9/4401* (2018.01)
  *G06F 12/109* (2016.01)

(52) U.S. Cl.
  CPC .......... *H04L 45/64* (2013.01); *H04L 63/1416* (2013.01); *G06F 9/4406* (2013.01); *G06F 12/109* (2013.01)

(56) References Cited

U.S. PATENT DOCUMENTS

| | | | |
|---|---|---|---|
| 9,491,094 | B2 | 11/2016 | Patwardhan et al. |
| 9,692,690 | B2 | 6/2017 | Joshi et al. |
| 2018/0114012 | A1* | 4/2018 | Sood .................. G06F 21/79 |

FOREIGN PATENT DOCUMENTS

| | | |
|---|---|---|
| CN | 106105116 A | 11/2016 |
| WO | 2015040624 A1 | 3/2015 |
| WO | 2015197120 A1 | 12/2015 |
| WO | 2016174597 A1 | 11/2016 |
| WO | 2016178134 A1 | 11/2016 |
| WO | 2017194989 A1 | 11/2017 |
| WO | 2018115934 A1 | 6/2018 |
| WO | 2019012546 A1 | 1/2019 |

OTHER PUBLICATIONS

Browne, et al., "Network Service Header Time Stamping," draft-browne-ietf-sfc-nsh-timestamp-00, IETF Trust, Network Working Group, Internet-Draft, Oct. 19, 2015, pp. 1-15.
Cisco Systems Belgium, "SEC013 v.6 Updates, Comments, Suggestions," Draft ETSI GS NFV-Sec 013 v0.0.65 (Oct. 2016), Network Functions Virtualisation (NFV), Security Report, Security Management and Monitoring for NFV [Release 2], submitted Nov. 17, 2016, 50 pages.
ETSI GS NFV-REL 004 V1.1.1, "Network Functions Virtualisation (NFV); Assurance; Report on Active Monitoring and Failure Detection," European Telecommunications Standards Institute, Group Specification, Apr. 2016, pp. 1-61.
F5 Networks, Inc., "Health and Performance Monitors," LTM Manual, LTM Configuration Guide, version 10.0.0, Appendix A, Monitor Types, downloaded from https://support.f5.com/kb/en-us/products/big-ip_ltm/manuals/product/tm_configuration_guide_10_0_0/1 . . . on Aug. 24, 2016, pp. 1-39.
Intel Corporation, "Intel Processors and Chipsets by Platform Code Name," downloaded from https://www.intel.com/content/www/us/en/design/products-and-solutions/processors-and-chipsets/platfo . . . on Jun. 4, 2019, pp. 1-8.
Linux Foundation, "Open vSwitch Manual," Version 2.3.90, Database Schema 7.10.1, Sep. 14, 2011, downloaded from http://openvswitch.org/ovs-vswitchd.conf.db.5 pdf, pp. 1-58.
Linux Kernel Organization, Inc., "Real Time Clock (RTC) Drivers for Linux," Linux Kernel Archives, https://www.kernel.org/doc/Documentation/rtc.txt, Jun. 4, 2016, pp. 1-3.
Open Networking Foundation, "In-band Network Telemetry (INT)" v0.5, The P4.org Applications Working Group, Dec. 11, 2017, pp. 1-29.
Open Networking Foundation, "OpenFlow Switch Specification," Version 1.3.5 (Protocol version 0X04), ONF TS-023, Mar. 26, 2015, pp. 1-177.
Open Networking Foundation, "OpenFlow Switch Specification," Version 1.5.1 (Protocol version 0x06), ONF TS-025, Mar. 26, 2015, pp. 1-283.
Open Networking Foundation, "SDN Architecture," pre-publication of issue 1.1, 2016, ETSI, Network Functions Virtualisation (NFV), XP014266968, Jan. 22, 2016, 60 pages.
Openstack.org, "Monitoring Framework for VNF Manager," last updated Sep. 5, 2015, downloaded from https://specs.openstack.org/openstack/tacker-specs/specs/liberty/monitor-framework.html on Jun. 4, 2019, pp. 1-6.
First Chinese Office Action for Chinese Patent Application No. CN 201780083526.2 dated Nov. 19, 2021, 13 pages (including English translation).

* cited by examiner

SCALABLE APPLICATION LEVEL MONITORING FOR SDN NETWORKS

CROSS-REFERENCE TO RELATED APPLICATIONS

This application is a national stage of International Application No. PCT/IB2017/050205, filed Jan. 14, 2017, which is hereby incorporated by reference.

TECHNICAL FIELD

Embodiments of the invention relate to the field of application level monitoring in a network. More specifically, the embodiments relate to a method and apparatus for scalable application level monitoring in a software defined networking (SDN) network.

BACKGROUND

Software defined networking (SDN) is a network architecture where data plane functions and control plane functions are abstracted and separated enabling more dynamic and configurable network devices in the network. The network may be configured and managed by a SDN controller, which manages the control plane of the network. The SDN controller can be centralized or decentralized and implements the control plane functionality of the network as well as provides an interface for application layer functions to affect the data plane of the SDN network.

The network devices in the data plane may be referred to as data plane nodes. The data plane nodes are configured by the SDN controller and the applications to implement forwarding and processing of data traffic. In some embodiments, the data plane functions are implemented in a single network device while in other embodiments data plane functions may be distributed over multiple network devices. The data plane nodes may communicate with the SDN controller using a flow control protocol and may implement the forwarding and data traffic processing via a set of flow control tables. The flow control protocol can be the OpenFlow protocol developed by the Open Networking Foundation or similar protocol.

The SDN architecture may be consistent with an OpenFlow architecture or similar software defined networking architecture such as the Open Network Environment, software defined wide area network (SD-WAN) or similar architectures. These architectures utilize a centralized system for application layer monitoring. The applications interface with the data plane nodes via the SDN controller. All traffic related to the application layer monitoring passes through the SDN controller to reach the application layer that is implementing the monitoring. Thus, there is significant traffic from throughout the SDN network that is directed to the SDN controller which requires significant bandwidth allocation and compute resources.

SUMMARY

In one embodiment, a method is implemented by a network device to reduce bandwidth and compute resources needed by the controller of a software defined networking (SDN) controller by distributing monitoring of virtual network functions (VNFs) to data plane nodes (DPNs) in a SDN network. The method includes receiving a monitoring request from the SDN controller to monitor a VNF, receiving a byte sequence from the SDN controller for the VNF, and generating flow table entries for monitoring the VNF by matching the byte sequence with monitoring response messages from the VNF.

In another embodiment, a network device configured to execute the method to reduce bandwidth and compute resources needed by the controller of a SDN controller by distributing monitoring of VNFs to DPNs in a SDN network, the network device including a non-transitory computer-readable medium having stored therein an application monitor, and a processor coupled to the non-transitory computer-readable medium. The processor executes the application monitor. The application monitor receives a monitoring request from the SDN controller to monitor a VNF, receives a byte sequence from the SDN controller for the VNF, and generates flow table entries for monitoring the VNF by matching the byte sequence with monitoring response message s from the VNF.

In a further embodiment, a computing device functions as a network node. The computing device executes a plurality of virtual machines for implementing network function virtualization, wherein a virtual machine from the plurality of virtual machines is configured to execute a method to reduce bandwidth and compute resources needed by the controller of a SDN controller by distributing monitoring of virtual network functions VNFs to DPNs in a SDN network. The computing device includes a non-transitory computer-readable medium having stored therein an application monitor, and a processor coupled to the non-transitory computer-readable medium. The processor executes a virtual machine from the plurality of virtual machines. The virtual machine executes the application monitor, the application monitor to receive a monitoring request from the SDN controller to monitor a VNF, receive a byte sequence from the SDN controller for the VNF, and generate flow table entries for monitoring the VNF by matching the byte sequence with monitoring response message s from the VNF.

In one embodiment, a control plane device implements a control plane of a SDN network including a plurality of network devices implementing the data plane of the SDN network, the control plane device configured to execute a method to reduce bandwidth and compute resources needed by the controller of a SDN controller by distributing monitoring of VNFs to DPNs in a SDN network. The control plane device including a non-transitory computer-readable medium having stored therein an application monitor, and a processor coupled to the non-transitory computer-readable medium. The processor to execute the application monitor. The application monitor to send an initial monitoring request for a VNF to a DPN, receive a monitoring response message from the DPN, and send a byte sequence to the DPN for the VNF to enable the DPN to identify monitoring response messages from the VNF to forward to the application monitor.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
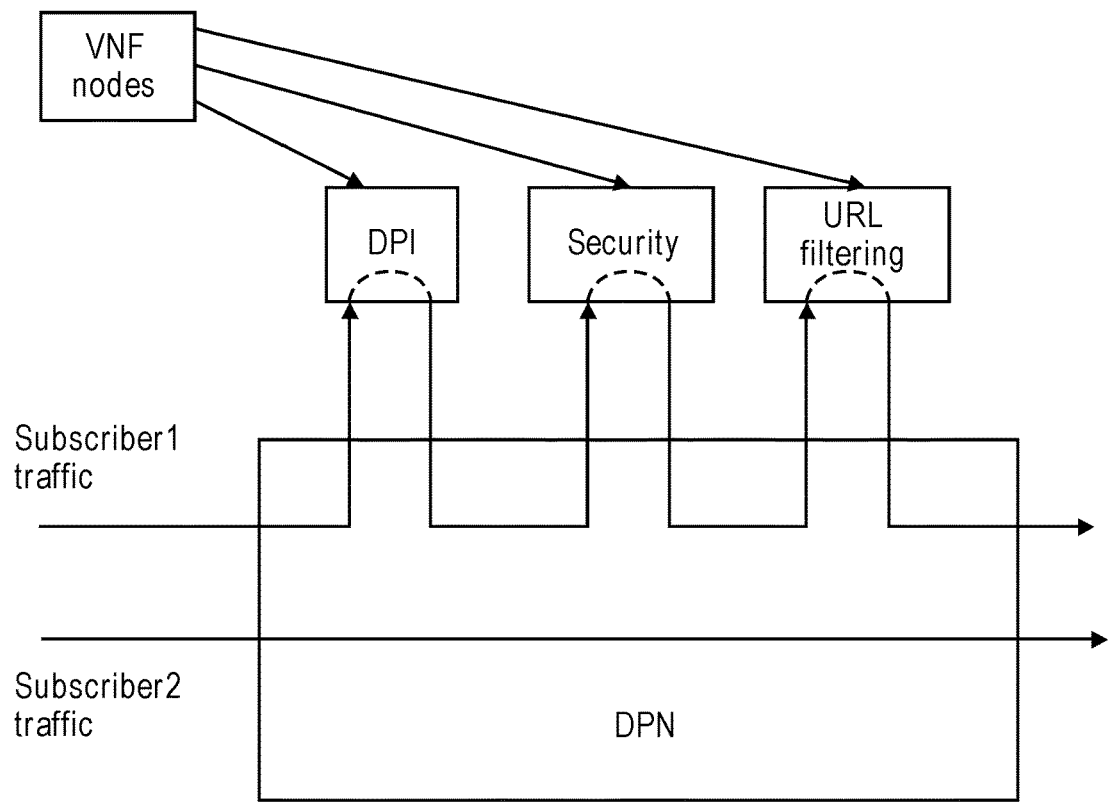
FIG. 1 is a diagram of one embodiment of service chaining in a software defined networking (SDN) network.
Figure 1:
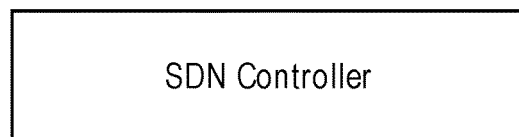

The following description describes methods and apparatus for monitoring application layer functions in a network. More specifically, the embodiments provide a method and apparatus for scalable application level monitoring in a software defined networking (SDN) network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

Software Defined Networking (SDN) networks may be implemented using flow control protocols to enable a controller to configure the forwarding processes of the data plane nodes of the SDN network. In one embodiment, an SDN may be based on the OpenFlow protocol or similar protocol for programmatic access of the data plane of the SDN network. The nodes in data plane are called DPNs (data plane nodes). These DPNs are controlled and configured by a distinct node called the controller. The controller and DPN are usually physically distinct nodes. Some SDN architectures are based on open networking standards (e.g. a whitebox DPN). This means that solution should be standard based and interoperable with other SDN architectures. The OpenFlow protocol is an example of such an open standard to enable control of a DPN by the controller. In other embodiments, proprietary flow control and SDN architectures may be used or may be used in combination with open standard based SDN architectural components.

SDN networks support service chaining. Service chaining is a process where data traffic is processed by a set of functions often across a number of network devices. These services are sometimes applied by Internet service providers and similar network operators to perform administrative and accounting services like authentication, firewall and similar services. These services or functions can be implemented via virtualization via virtual network function (VNFs). For example, service chaining can be used to handle subscriber traffic such that the traffic is steered through a pre-defined sequence of services implemented as VNF nodes. The VNF nodes provide different functionality such as content-caching, content filtering, security and similar functions.

FIG. 1 is a diagram of one example of a service chain in a SDN network. In this example embodiment, subscriber traffic is subjected to deep packet inspection (DPI), security processing and uniform resource locator (URL) filtering. These services can be implemented to enforce parental control processors or similar processes. In the example, each of these services is implemented by a VNF node. The services can be implemented or distributed over any number of VNF nodes. In the example, subscriber traffic 1 traverses a DPN that has been configured by a SDN controller. The DPN sends subscriber traffic 1 to each of the VNFs for processing. In this example, subscriber traffic 2 may not be subject to the same service chain, thus, the SDN controller has not configured the DPN to send this traffic to the service chain.

Use of a SDN to implement service chaining allows the steering of traffic based on highly granular subscriber profile and application profile information. It also allows an operator to quickly and easily introduce new services/VNFs for subscribers. An SDN based service chaining implementation may be considered to include a transport domain and a service domain. The transport domain may include at least one DPN that is responsible for forwarding the subscriber traffic to each service/VNF. The transport domain can also be distributed over multiple DPNs. The service domain includes the services/VNF nodes that implement the functionality of the service chain.

Figure 2:
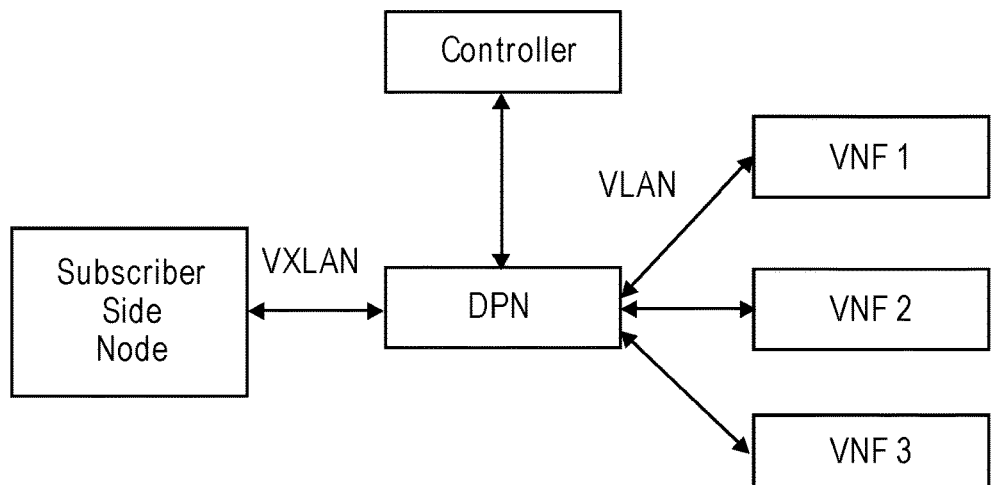
FIG. 2 is a diagram of one embodiment of connectivity of a data plane node (DPN) in the SDN network.

FIG. 2 is a diagram of one embodiment of a DPN connectivity in an SDN implementing a service chain. The service nodes (i.e., the VNF nodes), are connected to the SDN transport domain typically via a virtual local area network (VLAN), using a virtual extensible LAN (VxLAN) or through a similar network configuration. Unlike DPN (which are part of transport domain and can be considered to be robust Layer 2 switches), the VNF nodes are more akin to servers. As illustrated in FIG. 2, a DPN may be connected to a set of VNF as well as the controller and a subscriber node. In the example, the DPN is connected to a set of VNF nodes via a VLAN, a subscriber node via a VxLAN and a controller via the SDN. A 'set,' as used herein, refers to any positive whole number of items including one item.

To detect a link failure between DPNs, an SDN controller employs techniques that are similar to the ones used to detect link failure between Layer 2/Ethernet switches (since DPNs are similar to Layer 2/Ethernet switches). These methods, for example, include use of link layer discovery protocol (LLDP) or bidirectional forwarding detection (BFD) protocol. Such techniques are, however, not sufficient for monitoring VNF nodes. This is because VNF nodes are similar to servers rather than Layer 2/Ethernet switches. The VNF nodes are instead monitored at the application layer. For application layer monitory requires different techniques, processes and protocols to check the connectivity and the availability of these VNF nodes.

In one example embodiment, an open standard application layer manager may be employed, e.g., Tacker is generic VNF Manager (VNFM) and a network function virtualization (NFV) Orchestrator (NFVO) implemented in conjunction with OpenFlow to deploy and operate network services and VNFs on an NFV infrastructure platform like OpenStack. One of the functions of Tacker is the health monitoring of deployed VNF. Tacker monitoring framework provides the NFV operators and VNF vendors the ability to write a pluggable driver that monitors the various status conditions of the VNF entities it deploys and manages. However, the Tacker monitoring framework implements only simple monitoring and integrates with an external monitoring system for advanced monitoring. In some embodiments, the processes presented herein can be used as external monitoring system that integrates with Tacker. The simple monitoring defined in Tacker involves pinging the management IP-address of a given service.

The NFV European Telecommunications Standards Institute (ETSI) Industry Specification Group (ISG) has produced and approved a report on active monitoring that proposes an active monitoring framework for NFV. The key elements or components of this framework are (1) a test controller, which maintains a catalogue of virtual test agents, and (2) virtual test agents (VTAs), which are similar to a traditional physical test agent, this agent provides network visibility and fault tolerance in an NFV based network. Unlike physical active test agents, the test agent is a virtual entity, so that it can be effective in NFV environment. Another component is the test result analysis module (TRAM), where this module gets the test results from virtual test agents and subsequently provides the processed results to presentation module in OSS/BSS.

Figure 3:
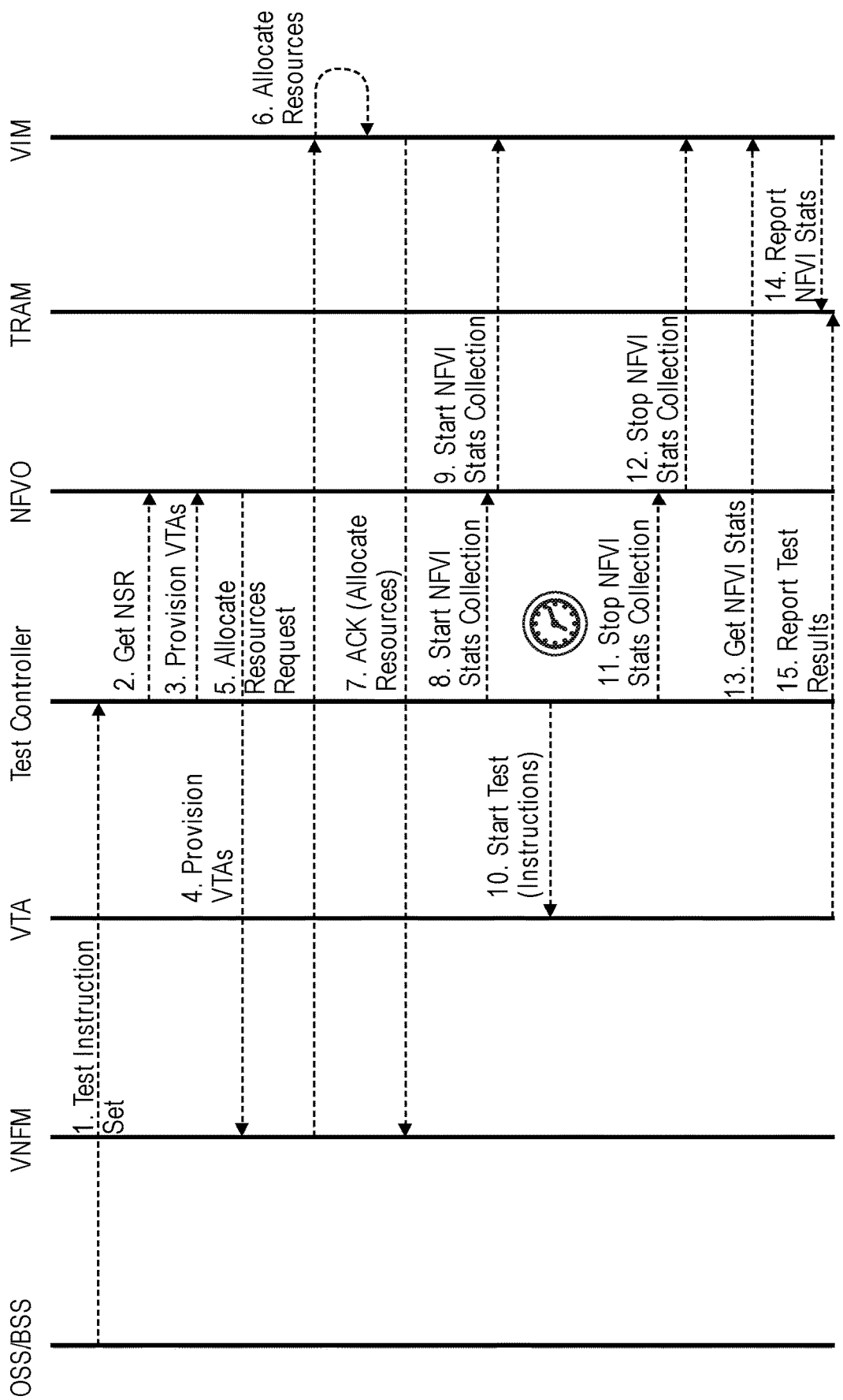
FIG. 3 is a diagram of one embodiment of a messaging sequence for active monitoring in a SDN network.

FIG. 3 is a diagram of one embodiment of a process for setting up active monitoring. The embodiments are consistent with this process. In this process the operations support subsystem/business support subsystem (OSS/BSS) initiate the process by sending a test instruction set to the test controller. The test controller may get the network status record (NSR) from the NFV orchestrator (NFVO) and provision VTAs. The NFVO response with the provisioning of VTAs at the virtual network function manager (VNFM). The VNFM generations an allocate resources request that is sent to the virtualized infrastructure manager (VIM). The VIM allocates resources accordingly. The VIM then acknowledges the resource allocation to the VNFM. The test controller starts the NFV infrastructure (NFVI) statistics collection and the NFVO starts NFVI status collection. The test controller sends the instructions for the start of the test to the VTA and after a predetermined time ends the NFVI statistics collection. A stop NFVI statistics collection message is sent by the NFVO to the TRAM and VIM. The test controller can then send a get NFVI statistic message to the VIM, which reports the NFVI statistics to the TRAM. The VTA can send a report of the test results to the TRAM at that time.

In some embodiments, the controller generates monitoring request packets and consumes monitoring response packets. These monitoring messages (request and response messages) consume bandwidth between controller and the DPNs. These messages also result in consumption of computing resources at the controller. The situation is further complicated in specific scenarios. The first scenario is when a large number of VNF are monitored, which causes a scaling issue. This is because monitoring messages need to be generated (and consumed) on per VNF basis. A second scenario is where a VNF failure needs to be detected quickly, which is a latency issue. This is because, for quicker detection, monitoring messages need to be sent at a high rate. Usually there is a trade-off between bandwidth consumption (between controller and DPNs) and time-to-detect VNF failure.

The embodiments overcome these limitations of art. The embodiments are consistent with the terminology of the ETSI report where an SDN controller services as a test controller, the virtual test agent is co-located with the DPN and the test results analysis module (TRAM) is provided by the SDN controller. The virtual test agent (VTA) is co-located with DPN (such as open virtual switch (OVS)/cloud SDN switch (CSS)) and the SDN controller. The SDN controller may function as the TRAM, however, other applications can be built over the SDN controller to act as TRAM.

For optimizing VNF aliveness monitoring, the embodiments are facilitated by observing that to monitor the aliveness of VNF node, application level monitoring packets generated by the SDN controller are sent out to a VNF node via the DPN. These periodic requests sent to VNF nodes are usually identical. Similarly, the corresponding responses coming from VNF nodes are usually identical. In addition, the VNF node is typically stable and works as expected. As a result, when controller involvement is reduced for these typical scenario (i.e., where the VNF is working as expected), then it will significantly reduce the resource (compute and bandwidth) usage. Specifically, these reductions of resources include reductions in network resource/bandwidth usage between the controller and DPN, as well as, reductions in processor (e.g., central processing unit (CPU)) usage at the controller.

In order to obtain the optimization based on these insights, the embodiments configure the controller to delegate periodic generation of monitoring packets to the DPN. The controller programs DPNs in such a manner that the DPN can periodically generate (identical) monitoring request packets without involvement of the controller. In addition, the controller delegates the consumption of application level monitoring response message from VNF nodes by DPNs themselves. The controller programs DPNs such that each DPN consumes the expected monitoring response from the VNF locally (instead of sending the received responses to the controller). The controller provides the byte sequence (with offset) for an expected monitoring response message to the DPN (for a given VNF node) based on the initial successful response coming from VNF node. The DPNs consume application level protocol response messages (e.g., a domain name server (DNS) response code) without implementing the higher-level protocols, by matching the monitoring response message against a sequence of bytes.

With this configuration, the controller is notified when a response message does not match expected byte sequence or when an expected monitoring response message is not received within configured amount of time. This process and system allows the controller to receive only status change information (from application-up to application-down).

Figure 4:
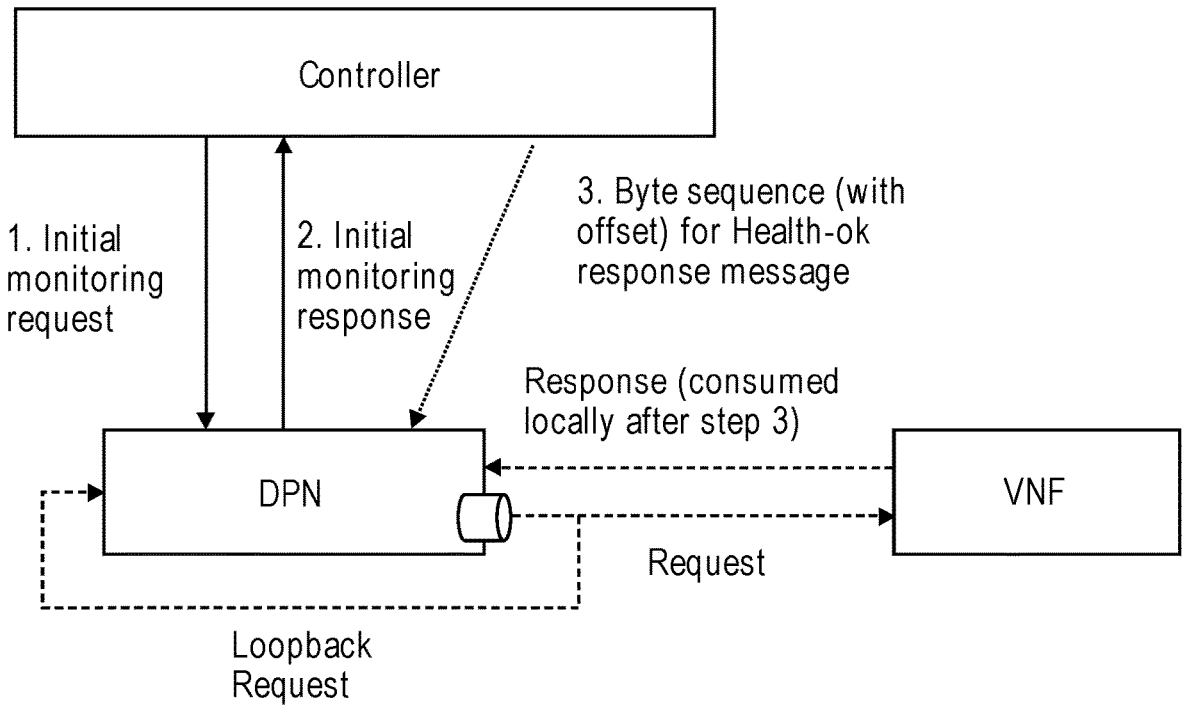
FIG. 4 is a diagram of one embodiment of a process for monitoring a virtual network function by a DPN.

FIG. 4 is a diagram of one embodiment of a process for monitoring a virtual network function by a DPN. The illustrated process is shown in a simplified representation in FIG. 4 where a SDN controller configures a DPN to monitor a specific VNF. In this example embodiment, the controller sends (1) an initial monitoring request to start the monitoring of the VNF. The initial monitoring request can be any type of message and may configure the DPN to send monitoring request messages to the VNF. Specific examples of such configuration are described further herein below. The DPN may forward the initial monitoring response received from the VNF (2). In one embodiment, the initial monitoring response can be analyzed by the controller to determine a byte sequence (which may include an offset) that can be utilized to identify a response message indicating that the VNF is operating properly. In other embodiments, multiple monitoring responses may be processed to determine the byte sequence. This byte sequence can then be used to complete configuration of the DPN (3) to enable the DPN to recognize response messages indicating proper operation thereafter. The DPN then continues to send monitoring request messages and discarding responses from the VNF that indicate proper operation. A loopback request may be used as a mechanism to prompt the DPN to continue to send monitoring request messages.

Figure 5:
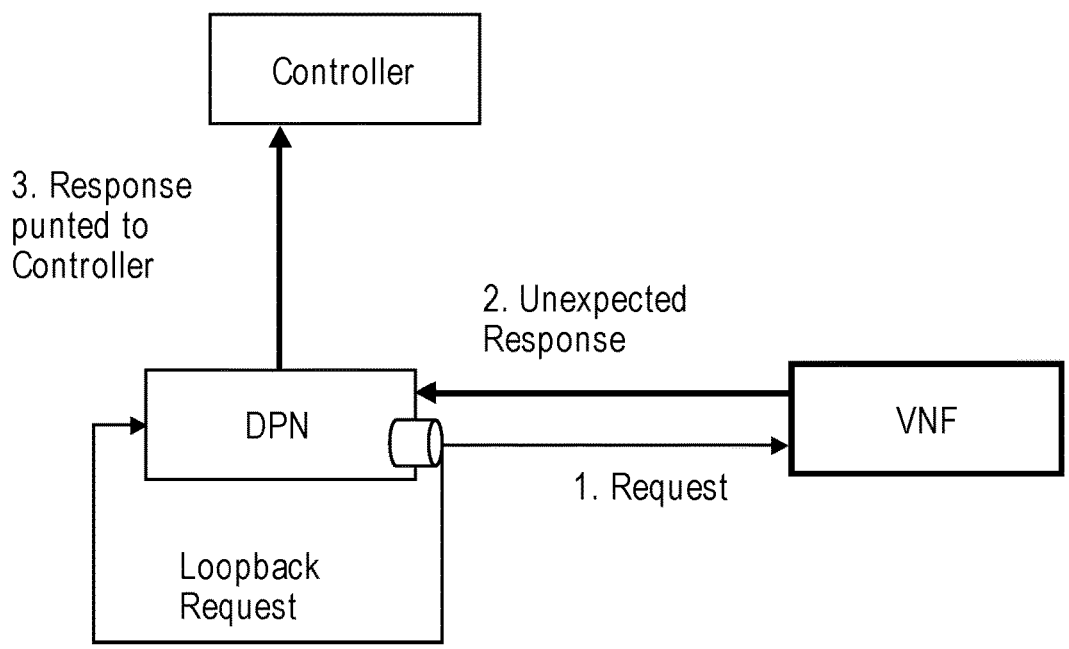
FIG. 5 is a diagram of one embodiment of a process for monitoring a virtual network function by a DPN where an unexpected response is received.

FIG. 5 is a diagram of one embodiment of a process for monitoring a virtual network function by a DPN where an unexpected response is received. The monitoring response message is typically identical for a VNF node when it is responding that the VNF is operating properly. In such case, once the controller has identified a successful response from VNF node, the DPN can be configured to locally consume the subsequent responses. However, where a response is received that does not match the expected byte sequence, then the response is likely indicating that the VNF is not operating properly. Stated differently, when a response request has been sent to a malfunctioning VNF (1) either an unexpected response is then received from the VNF (2) or the response times out. In either case, the unexpected response or a notification of the timeout is sent by the DPN to the controller (3).

Since the embodiments depend only on byte matching of the incoming response at DPN, it allows the monitoring of the VNF to be generic enough to handle any kind of monitoring protocol. In particular, different protocols such as ARP, ICMP, DNS etc. can be handled as long as the controller can parse such protocol responses, without requiring protocol parsers for the protocol at the DPN.

This process and system provides advantages over the art. The virtual test agent's functionality is implemented without a need of a separate test agent virtual machine. This is especially useful in micro-datacenter scenario where footprint of infrastructure components needs to be small. There is no additional deployment step of virtual test agent since the DPN is always created during compute host setup phase. The application/higher level monitoring protocols can be used in SDN based network in efficient manner, without implementing them in DPN. Newer monitoring protocols can be introduced in the network, by providing a newer version of the controller (that implements the newer protocol), without updating the DPN. Since every DPN is involved only in monitoring VNF nodes connected with its ports, the solution can work at very high scale with a large number of data plane switches and VNFs. Since the work of detecting the VNF aliveness is distributed to multiple DPN nodes (instead of at a centralized controller node), the monitoring request packets can be sent at higher frequency from DPNs without a large impact on the controller node. Sending monitoring packets at high frequency allows for faster detection of link failures and hence faster topology convergence.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 6:
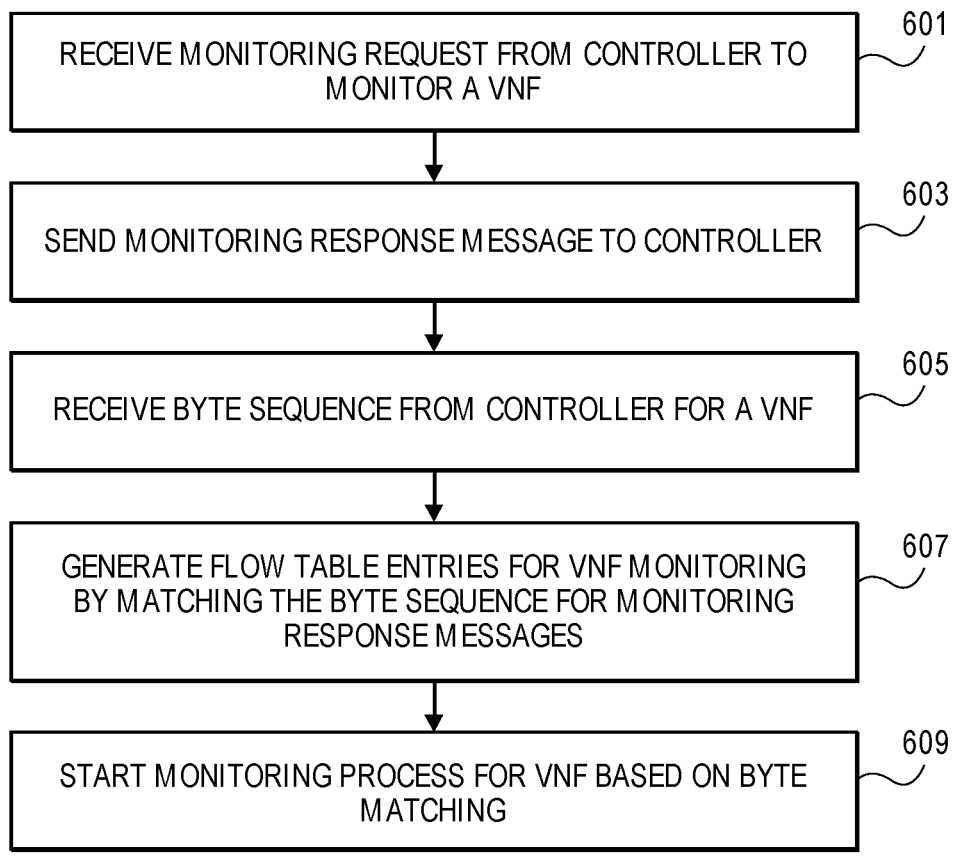
FIG. 6 is a diagram of one embodiment of a process for flow table configuration for application layer monitoring.

FIG. 6 is a flowchart of one embodiment of a process for configuring a DPN for application layer monitoring. The flowchart details the specific process as implemented by the DPN. The DPN receives the monitoring request from the controller (Block 601). The monitoring request may identify the VNF and provide configuration information for generating and sending a monitoring request message to the VNF. In addition, the configuration information may indicate to send a first response message from the VNF to the controller for analysis (Block 603). In other embodiments, the configuration information may provide information for identifying response messages that do not need to be sent to the controller.

The DPN may receive further configuration information after providing the initial response messages where the further configuration information identifies the byte sequence (and offset information) or similar information about response messages to enable the DPN to identify response messages that indicate the VNF is operating properly (Block 605). There may be any number of offset and byte sequence pairs that are identified and defined. These may be received at the same time or at any type after monitoring begins.

The DPN may configure flow tables or similar packet processing infrastructure to enable identification of response messages that match the byte sequence or similar identification information that is provided to recognize response messages that indicate proper operation by the VNF. The DPN can then commence the monitoring of the VNF by sending request messages to the VNF and matching response messages with the matching criteria.

Figure 7:
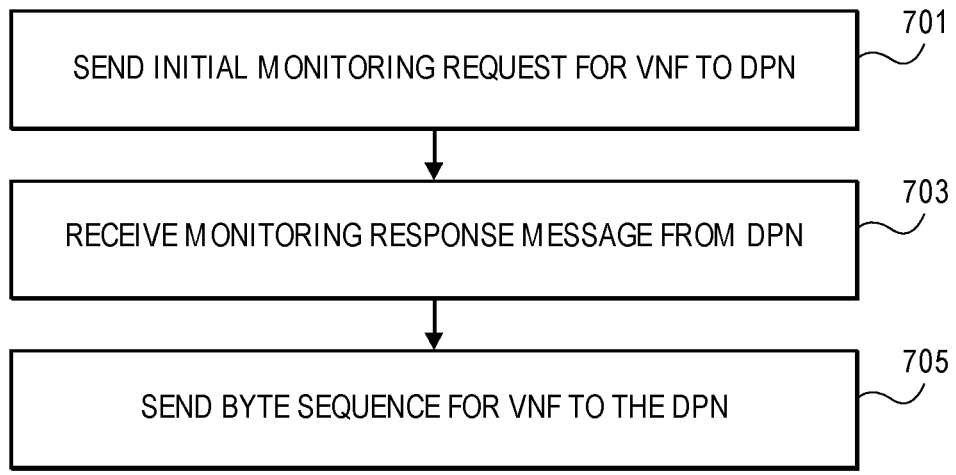
FIG. 7 is a flowchart of one embodiment of a process for configuring a DPN for application layer monitoring.

FIG. 7 is a flowchart of one embodiment of a process for configuring a DPN by the controller. Similarly, the operation of the controller begins with the sending of the initial monitoring request message to the DPN that will monitor a specified VPN (Block 701). In response, the DPN may send an initial response message from the VPN (Block 703). The controller or related application may analyze the response message or a set of initial response messages to identify a byte sequence and offset or similar identifying information to enable the identification of response messages that indicate normal operation of the VNF sending the message. This identification information in the form of, for example, a byte sequence and offset is sent to the DPN to configure the DPN to identify and discard these response messages from the VNF that indicate normal or proper operation (Block 705).

Figure 8:
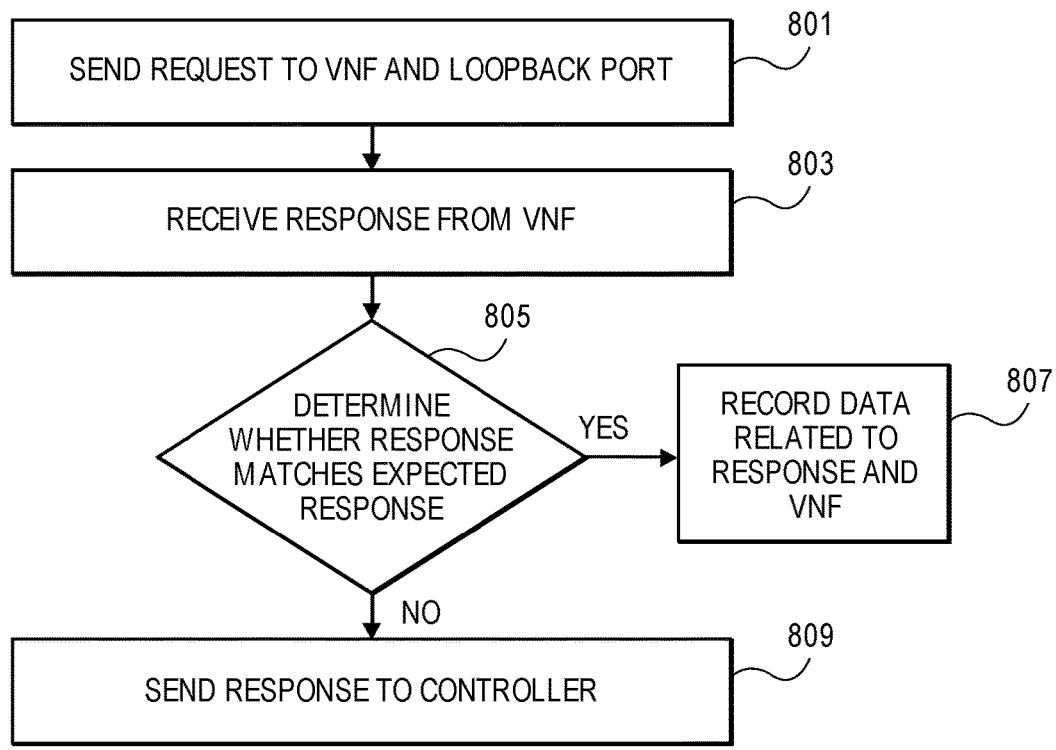
FIG. 8 is a flowchart of one embodiment of a process for configuring a DPN by the controller.

FIG. 8 is a flowchart of one embodiment of a process for sending application layer messages. The DPN once configured to recognize response messages from the VNF that indicate normal operation can send request messages to the VNF at any rate configured by the controller depending on the level of latency in failure detection that is desired (Block 801). The DPN then receives a response message from the VNF (Block 803). The response message is processed to determine whether it matches with the byte sequence and offset provided by the controller or similar matching criteria that enable the DPN to identify messages indicate proper operation of the VNF (Block 805). If the messages match the criteria, then the process may collect data related to the response message and any information in the messages relevant to the VNF operation as configured by the controller (Bock 807). The process may then restart by sending another request to the VNF or each request and response handling can be initiated and handled independently. Where the received message does not match the criteria, then the process may forward the received message to the controller for further processing (Block 809). In some embodiments, the forwarded message may also be processed for relevant data collection (Block 807). The controller can query the DPN to retrieve this collected information. The example is given to match on a single criteria (e.g., byte sequence and offset), however, any number of criteria (e.g., multiple byte sequence and offset pairs) can be checked for.

Example Embodiments and Variations

The process and system can be implemented in various configurations and the following embodiments are provided by way of example and not limitation. One skilled in the art would understand that other variations and configurations are possible consistent with the principles and structures described herein.

The embodiments are described in terms of monitoring request messages that are identical in nature. The monitor-request generation process however can be extended to support monitor-request generation processes that are more complex in nature.

The embodiments may include several modules with details about each component and their function herein below. In one embodiment, the components include a request replication module. This module on the DPN replicates, updates and sends monitor request packets on DPN ports connected to VNF node instances. It uses a Group table or similar flow table structure (e.g., a group table as defined in OpenFlow) to do these functions. From a component mapping perspective, this component will be part of a VTA (Virtual Test Agent) component.

A DPN may be connected to different types of VNF nodes such as network address translation (NAT), firewall and similar functions or services. Each of these VNF nodes may have a different monitoring protocol. As a result, a different group table entry is created for each type of VNF node. For ease of understanding, however, the embodiments are described with assumption of single type of VNF node.

Figure 9:
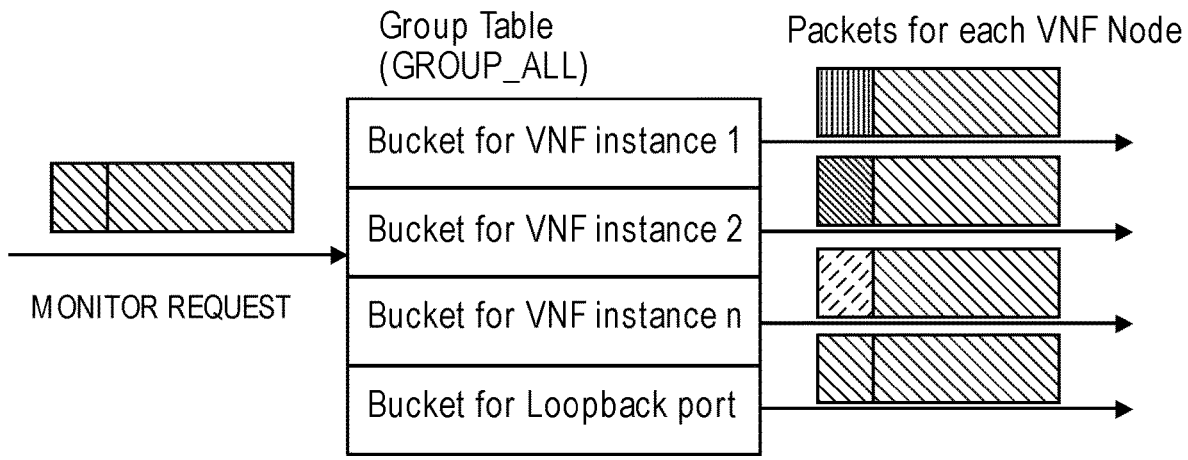
FIG. 9 is a flowchart of one embodiment of a process for sending application layer messages.

The controller installs a group entry for creating replicas of a monitor request packet. This may be achieved using a GROUP_ALL construct of the OpenFlow protocol with multiple action buckets. One action bucket is created for every OpenFlow port on which a monitor request packet is to be sent. One additional bucket is created for sending the packet to request-loopback-module, as described further herein below. Each action bucket updates the monitor request header fields as per the corresponding VNF node instance, before the sending the packet out on corresponding port. This module receives packets from the controller (during the start of the process) as well as from the request-loopback-module. FIG. 9 is a diagram of one embodiment of a flow table configuration for application layer monitoring, provided by way of example.

A further module in the embodiments may be a response handler module. This module implemented on a DPN handles monitoring-response messages received from VNF nodes. The module may be implemented via the flow table and contains the flow entries to identify monitoring response messages from known VNF nodes. From a component mapping perspective, this component will be part of VTA (Virtual Test Agent) component of the architecture. Each flow entry contains a match pattern based on Internet protocol (IP) headers that uniquely identifies a monitoring-response message from a VNF node, an action to PUNT (i.e., forward) packets to the controller, and a cookie value (a cookie as defined by the OpenFlow spec) to uniquely identify the flow entry. This entry is used by the response matching module described herein below to match an expected response. This flow table entries may also define an inactivity timeout value to determine when a response is not received in a timely manner from the VNF.

The following example table entry (TABLE I) shows a match for a monitoring-response packet coming from a VNF instance, with IP-address 10.1.1.1 where a DNS service is running on port 53 (DNS protocol). The entry has an inactivity timeout value of 5 sec.

TABLE I

Response Handler Table

| Cookie | Match | Actions | Inactivity Timeout |
|---|---|---|---|
| 123 | Ingress port 10, Source-IP-address 10.1.1.1 UDP-source-port 53 | Punt packets to Controller | 5 secs |

The embodiments also may include a response parser module. This module may be expected by the controller and parses the monitor-response message coming from VNF nodes. This module implements the required protocol parser to differentiate between a successful response and a failure response. From the component mapping perspective, this component will be part of a VTA (Virtual Test Agent) component of the architecture. This module is required for protocols that are not defined or well known (e.g., not defined in the OpenFlow specification) and hence cannot be parsed by the DPN. Examples of protocol include DNS response code. Once the module determines that a response is successful, and a subsequent response from the VNF will be similar/identical, the response parser module identifies the byte sequence and the offset that can be used to designate a response as successful.

The embodiments further include a response matching module. This module is executed by the DPN and matches the expected monitor-response message from VNF nodes using byte matching as identified by the response parser module. From a component mapping perspective, this component will be part of the VTA (Virtual Test Agent) component of the architecture. A response handler module (as described above), defines an action to punt (i.e., forward) all monitor response message to the controller via a PACKET-IN message (e.g., as defined by the OpenFlow protocol). All such messages going from the DPN to controller, pass through this response matching module. When a PACKET-IN message (for monitor response message) matches expected byte sequence, this module drops the packet, instead of sending the packet to the controller. This module may be implemented as a logical table outside of the OpenFlow pipeline. The module can include a flow table or set of entries that have match criteria (to match monitor response message) and the expected byte sequence. The match criteria consist of a Table id and cookie field. Both these fields are present in the PACKET-IN message. The table may also include an expected response—this notes the expected byte sequence. This may be denoted either as a regular expression such as a Perl Compatible Regular Expression (PCRE) expression or a simple byte matching where packet byte offset, number of bytes to match, expected bytes are used. An example of such table entries is shown below.

TABLE II

| Match Criteria | | Expected Response | |
|---|---|---|---|
| Table Id | Cookie | Type | Value |
| 10 | 0x1111 | PCRE | Value: *81 80* |
| 10 | 0x2222 | SIMPLE | Offset: 44, Number of bytes to match: 2 Value: 0x80 0x81 Offset-from-end: False |

The two types of response matching are provided primarily to cater for software and hardware based DPN. Software based DPN such as OVS can support PCRE kind of matching. Hardware based DPNs, however. may not be able to support PCRE based matching. In such cases, simple byte matching can be used.

DPNs and their components may be structured either as software based DPNs, hardware based DPNs or any combination thereof. A software based response matching module in a DPN may be configured to use complex string pattern matching rules that can be specified for the matching module. String pattern matching can be implemented using any software process in an efficient manner. In this case, the byte matching can be specified based on type and value. The type can be a field that specifies the type of matching to done. In case of software based DPN, it is set to 'PCRE.' A value field is correlated with the type field and is set to the regular expression that matches the successful response message.

In case of a hardware based response matching module in a DPN, specifying complex string matching rules may be minimized or avoided. In this case, byte matching is specified using a type, offset, offset from beginning or end and number of bytes to match. The type field specifies the type of matching to done. In the case of hardware based DPN, it may be set to a reduced complexity. An offset field is a numeric field that includes a byte offset indicating where in a response message that matching should start. The offset-from-end field specifies whether the offset should be calculated from beginning of the response message or from the end. In many monitoring protocols, such as HTTP, the VNF nodes may include protocol headers that are of varying lengths. In such cases, an offset from the end-of-packet is more useful to identify successful response information. This field may be structured to hold one of values True (1) or False (0). In some embodiments, a number-of-bytes-to-match field is a numeric field that specifies the number of bytes to match (from offset) in the response message. A value field may be a byte array that specifies the bytes that should match in the response message for the message to be considered a successful response.

Figure 10:
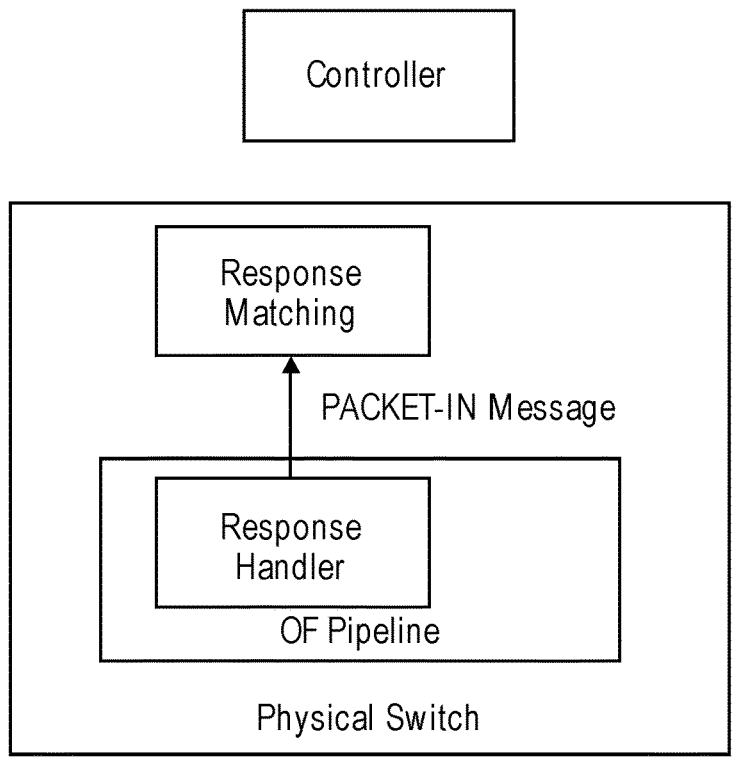
FIG. 10 is a diagram of one embodiment of a physical switch executing a response handler and response matching module.

As an example, a hardware response monitoring module may be configured using a configuration protocol such as Open vSwitch Database (OVSDB). FIG. 10 is a diagram of one embodiment of a physical switch executing a response handler and response matching module.

A controller_table can be used using an other_config field. One way to configure the response monitoring module is to provide a configuration as:

Other_config:"expected-response": \
<rule-number-1>, <table-id>, <cookie-id>, <match-type>, <match-value> \
<rule-number-2>, <table-id>, <cookie-id>, <match-type>, <match-value>.

For example, the configuration noted above can be done as

Other_config:" expected-response": "rule-1, 10, 0x1111, type-pere, val-* 8081*\
rule-2, 10, 0x2222, type-simple, Off-44, from-end-0, num-2, val-0x80 0x81, \

In one embodiment, a DPN includes and executes a request loopback module. This module causes the monitoring request message to be looped back as in input on a port of the DPN without involvement of the controller. From a component mapping perspective, this component will be part of VTA (Virtual Test Agent) component of the architecture. This module makes use of port recirculation (e.g., as defined in the OpenFlow specification) as well as set-queue action (e.g., also as defined in the OpenFlow specification). Such recirculation can take place between a port pair, in which a packet sent out on one logical port returns back into the switch via the other logical port of the pair. The request loopback module uses a pair of ports to loopback the monitor request message. It also associates a queue with the egress port to set the rate of monitoring-request. This module gets a packet from the request replicator module and sends the packet back to same.

Figure 11:
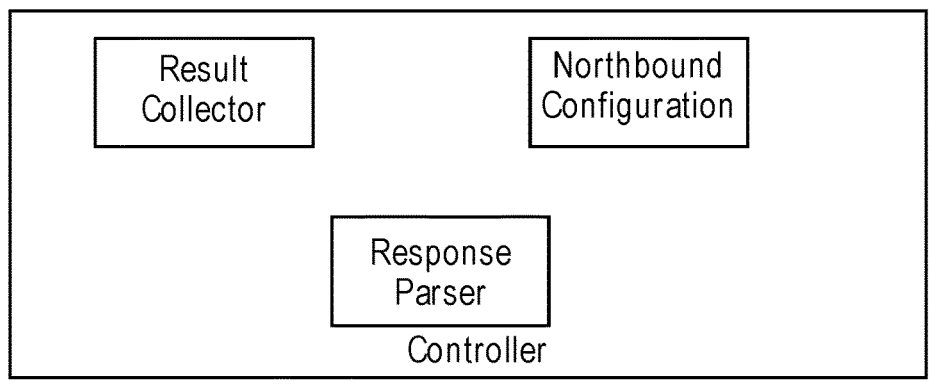
FIG. 11 is a diagram of one embodiment of the application layer monitoring of the SDN controller and DPN.
Figure 11:
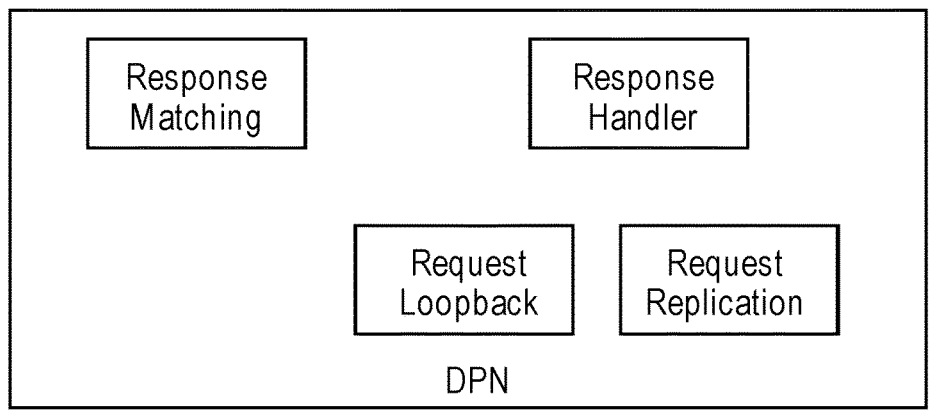

FIG. 11 is a diagram of one embodiment of the application layer monitoring of the SDN controller and DPN.

Figure 12:
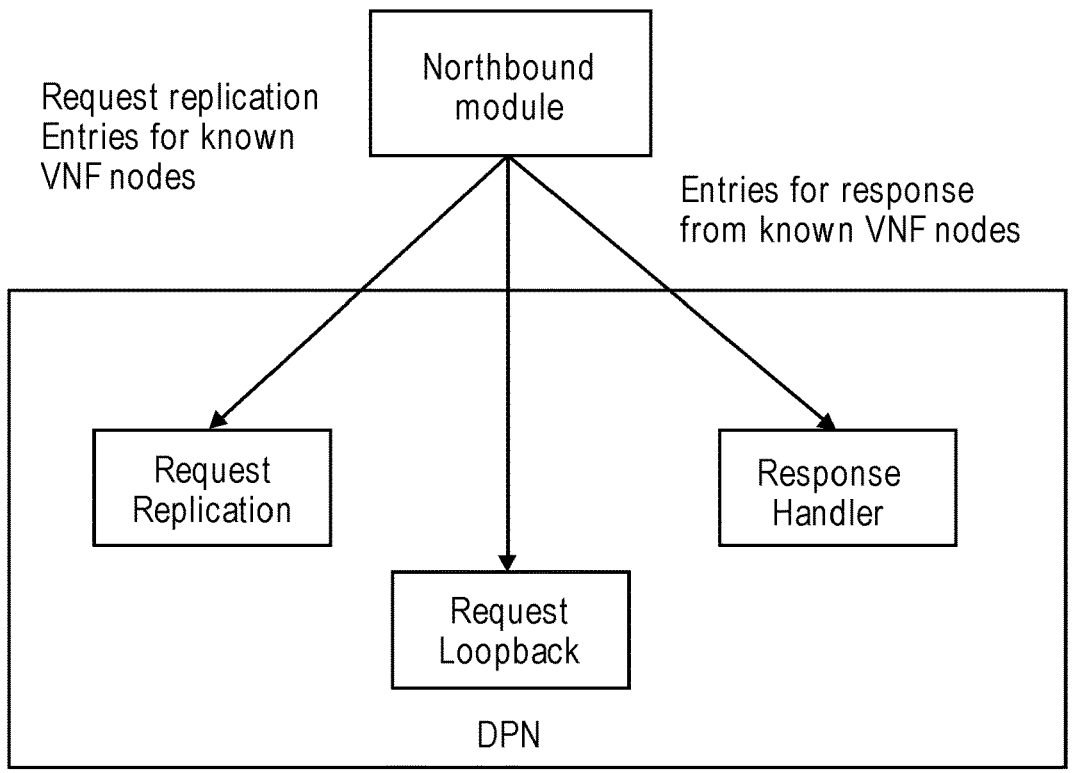
FIG. 12 is a diagram of one embodiment of response offloading.

FIG. 12 is a diagram of one embodiment of response offloading.

Figure 13:
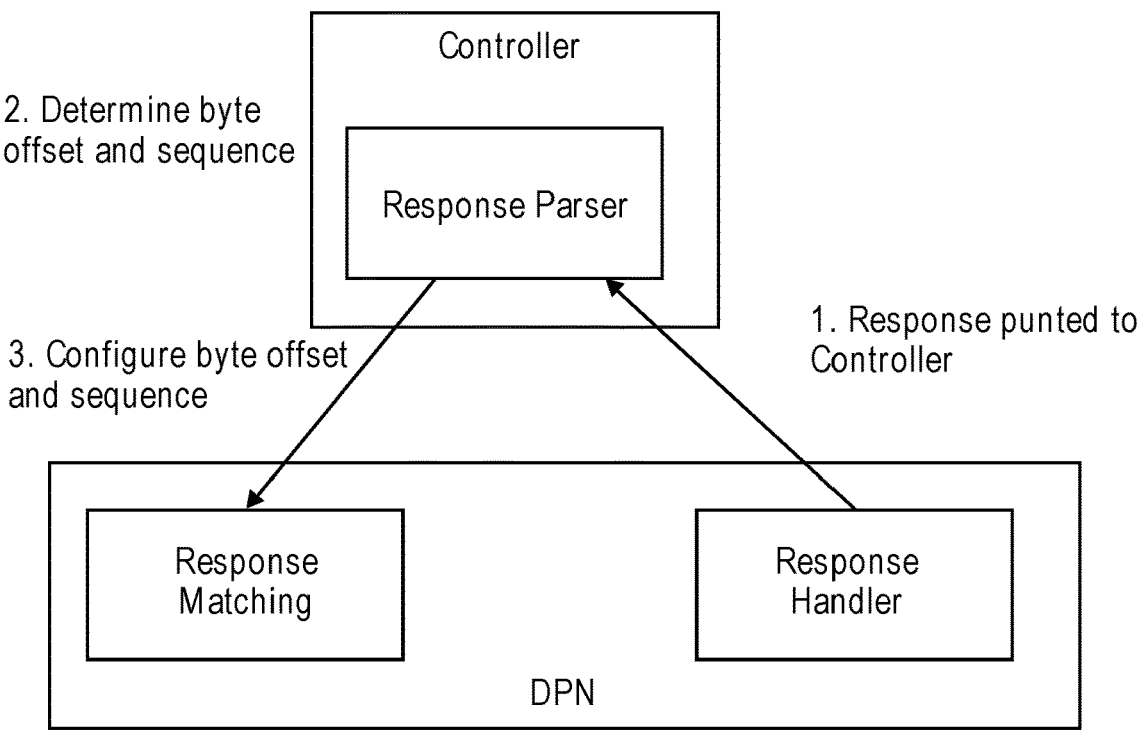
FIG. 13 is a diagram of one embodiment of an example test process.

FIG. 13 is a diagram of one embodiment of an example test process.

Figure 14:
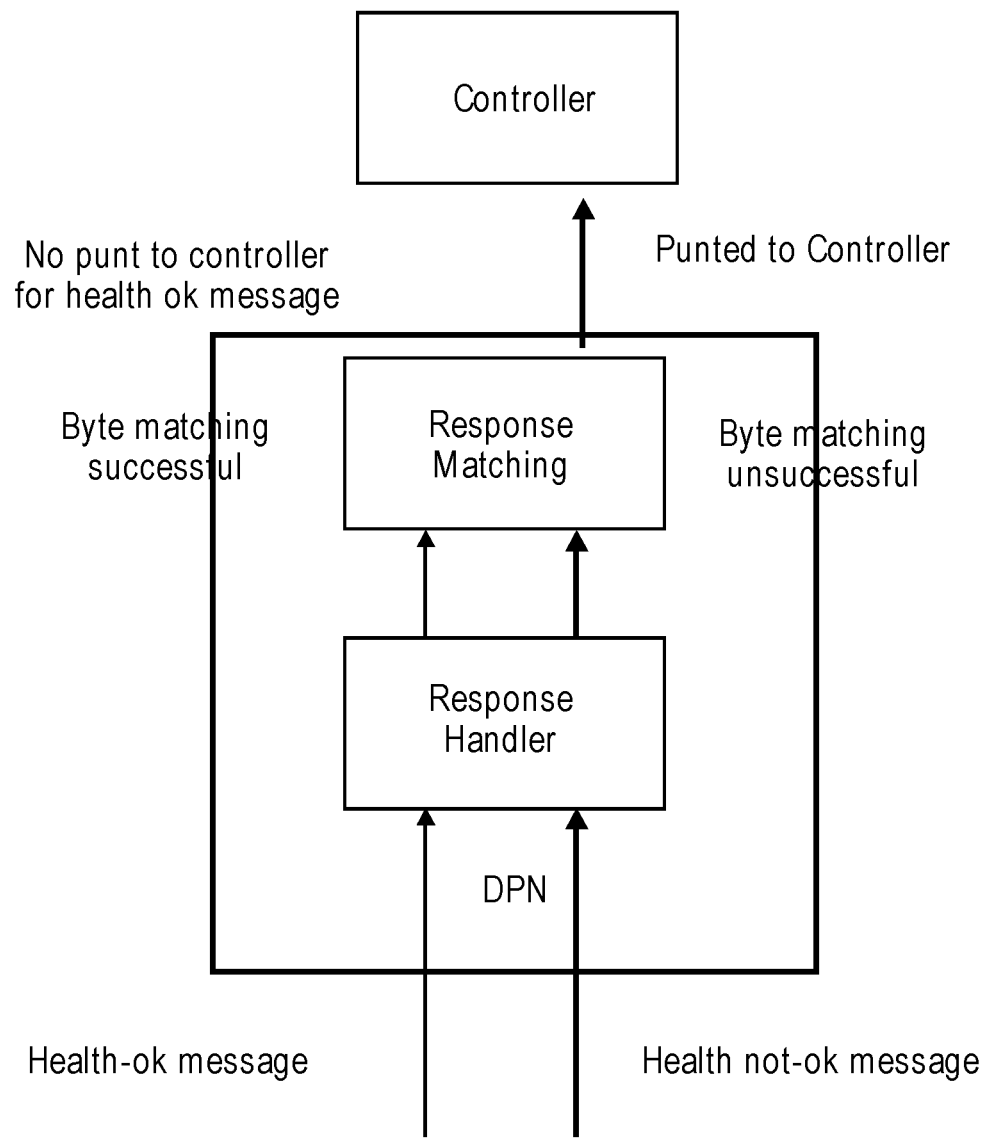
FIG. 14 is a diagram of one embodiment of response consumption.

FIG. 14 is a diagram of one embodiment of response consumption.

Figure 15:
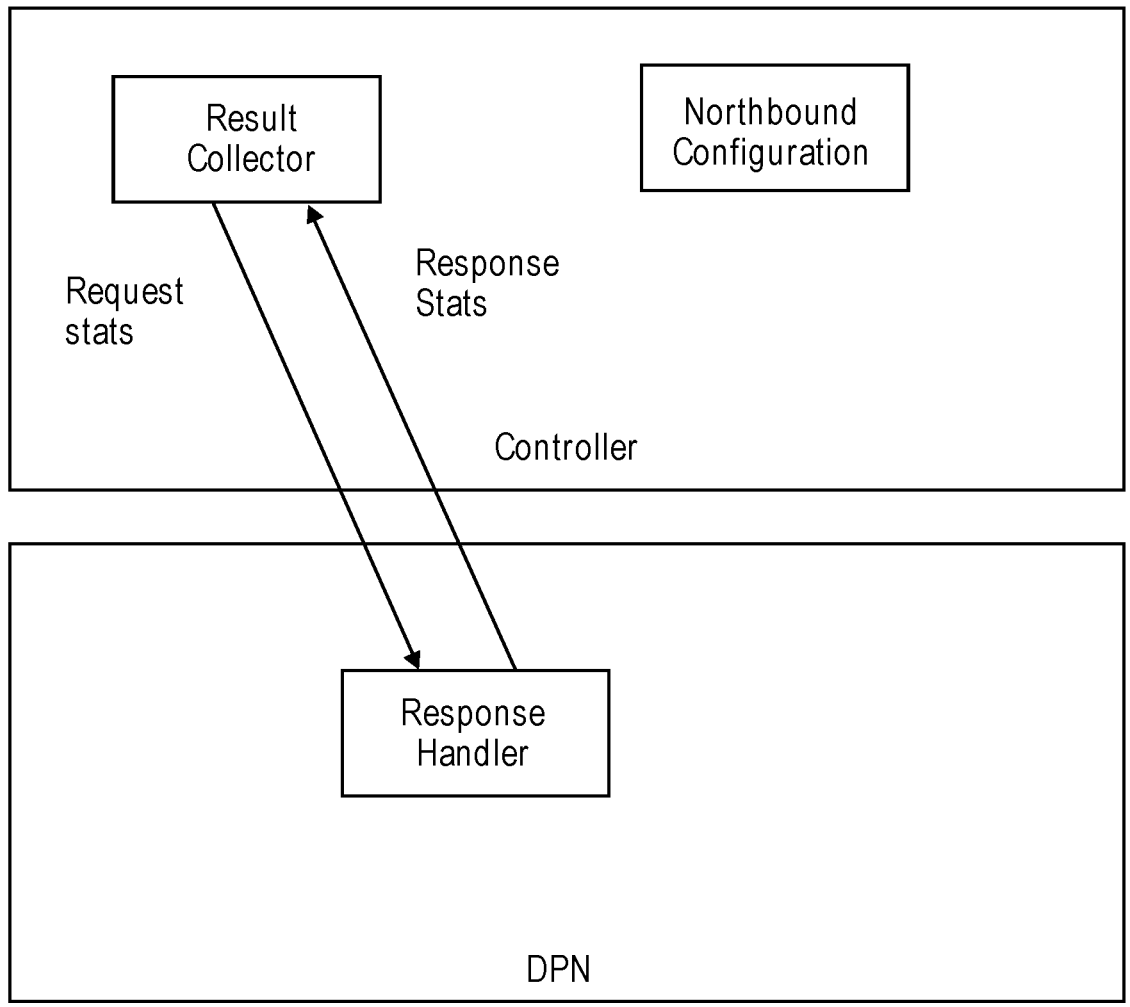
FIG. 15 is a diagram of one embodiment of a statistic collection process.

FIG. 15 is a diagram of one embodiment of a statistic collection process.

The system can also involve the northbound interface of the SDN controller. The northbound interface may receive instructions to start monitoring of (one or more) VNF instances. From component mapping perspective, this component maps to 'Test Controller' component in the architecture.

The system can further include a results collection module in the SDN controller. The results collection module collects results to tests executed by various VTAs. From a component mapping perspective, this component maps to the 'TRAM' component in the architecture. The TRAM can use a push or pull model to get results from the DPN and receives instructions to start monitoring (one or more) VNF instances from the northbound interface or similar source. This component may use a statistics related command defined in OpenFlow specification to get the statistics from the DPN. For example, the OpenFlow specification defines several commands to get statistics including individual flow statistics. This command is used to get statistics on a per flow entry basis. The response for this requests consist of the following parameters: duration—a time for which flow has been alive (\installed) in DPN, idle timeout—a number of seconds for inactivity timeout to kick in, packet count—a number of packets in a flow, and a byte count—a number of bytes. Another available command for statistic retrieval is aggregate statistics. This command is used to get aggregate statistics for a group of entries. The response for this request consists of following parameters: packet count and byte count.

In other embodiments, the OpenFlow protocol includes commands such as a "statistics trigger." Stats-trigger generates an event to the controller if some of the flow statistics cross one of the stat threshold values. The triggers can be of two types: only first—in this case, only the first threshold that is crossed is considered, and other thresholds are ignored. It allows the process to get only a single trigger for multiple thresholds. The other trigger is periodic—in this case, the trigger will apply not only on the values in the thresholds, but also on all multiples of those values. It allows, for example, to have a trigger every 100 packets for the lifetime of the flow.

FIG. 11 is a diagram of one embodiment of the application layer monitoring of the SDN controller and DPN. The figure illustrates the various modules and their placement among the controller and DPN in one embodiment. As described above, the result collector, response parser and northbound interface may be executed or configured as part of the controller. Whereas the response matching, response handler, request loopback and request replication are executed by or configured as part of the DPN. The controller and DPN can be in communication via any number of intermediate nodes and communication media in the SDN network.

Testing Example

The following examples and embodiments are presented to further illustrate the operation of the example embodiments and relate to a test. The process can begin with the start of the test. In this step, the northbound module receives instruction to setup the test. In response to such configuration, the controller does the following (1) sets up low table entries (e.g., OpenFlow tables) in the request replication module for known VNF nodes, and (2) sets up the request loopback module. It also configures the queue in loopback module so that requests are recirculated at an appropriate rate. The process further sets up flow table entries (e.g., OpenFlow tables) in the response handler module to punt (i.e., forward) monitor response packets from known VNF nodes to the controller. Once these modules are initialized, it sends initial request message to the request replication module.

As described herein above, the request replication module, replicates this message to all VNF nodes instances. It also forwards this to a loopback module. The loopback module sends/loops back the message to request replication module. This configuration via the northbound interface or 'northbound module' is illustrated in FIG. 12.

Response offloading is then established for the test as illustrated in FIG. 12. In this process, initial response messages from VNF nodes are punted (i.e., forwarded) to the controller by the response handler module. On receiving the response message, the controller does the following: (1) the response parser module on the controller identifies the response as successful or not, (2) for a successful response, the response parser module, determines the byte offset and byte sequence that can be used to classify the response as successful. Next (3), the controller configures the response matching module on DPN, to locally consume the successful responses.

In one embodiment, a local response consumption process is implemented by the DPN as illustrated in FIG. 13. In this operation, once the response message comes from VNF nodes, the DPN implements the following process: (1) the monitor-response message is matched against the response handler entries. The response handler module (2) sends the monitor response message to the response matching module. The response matching module (3) does the following, when there is no matching entry, it sends the packet to controller. When there is a matching entry, it compares the configured byte sequence (from offset) against the response message. When there is match, the response message is dropped (locally consumed). If there is no match, then the response message is sent to controller.

The embodiments also support collection of statistics between the DPN and the controller. In this process, illustrated in FIG. 13, the response collection module queries DPN to collect statistics. As noted in the module description, either a pull or a push model may be utilized depending on the support within the flow control protocol utilized. The DPN response handler facilitates data collection at the DPN and the result collector requests these statistics, which then are made available to applications via the northbound interface.

Thus, the embodiments provide a system wherein in SDN networks, there is an optimized handling active monitoring and this can be utilized to support load balancing functionality at the DPN. The load balancing functionality, however, involves implementing application level monitoring protocols to monitor health of server/VNF nodes. Typical load balancers such as F5 allow health monitoring using protocols such as an DNS response. These applications level (layer 7) protocol are however not part of/described by OpenFlow protocol.

The embodiments provide that such protocols can be implemented at SDN controller. For successful (normal operation) application response message, the SDN controller can determine the byte offset and byte sequence. It can then configure the DPN to match incoming monitor-response messages against these byte sequences. Incoming monitor-response messages that match the byte sequence need not be sent to Controller. The controller delegates the consumption of monitoring responses from VNF nodes to DPNs. It programs DPNs such that the DPN consumes the expected monitoring response locally instead of sending all the received responses to the Controller. The controller provides the byte sequence to match to DPN (for a VNF) based on the actual response coming from VNF. The DPNs consume higher level protocol responses (e.g., an DNS response code) without implementing the higher-level protocols by matching a sequence of bytes (from offset).

Architecture

Figure 16A:
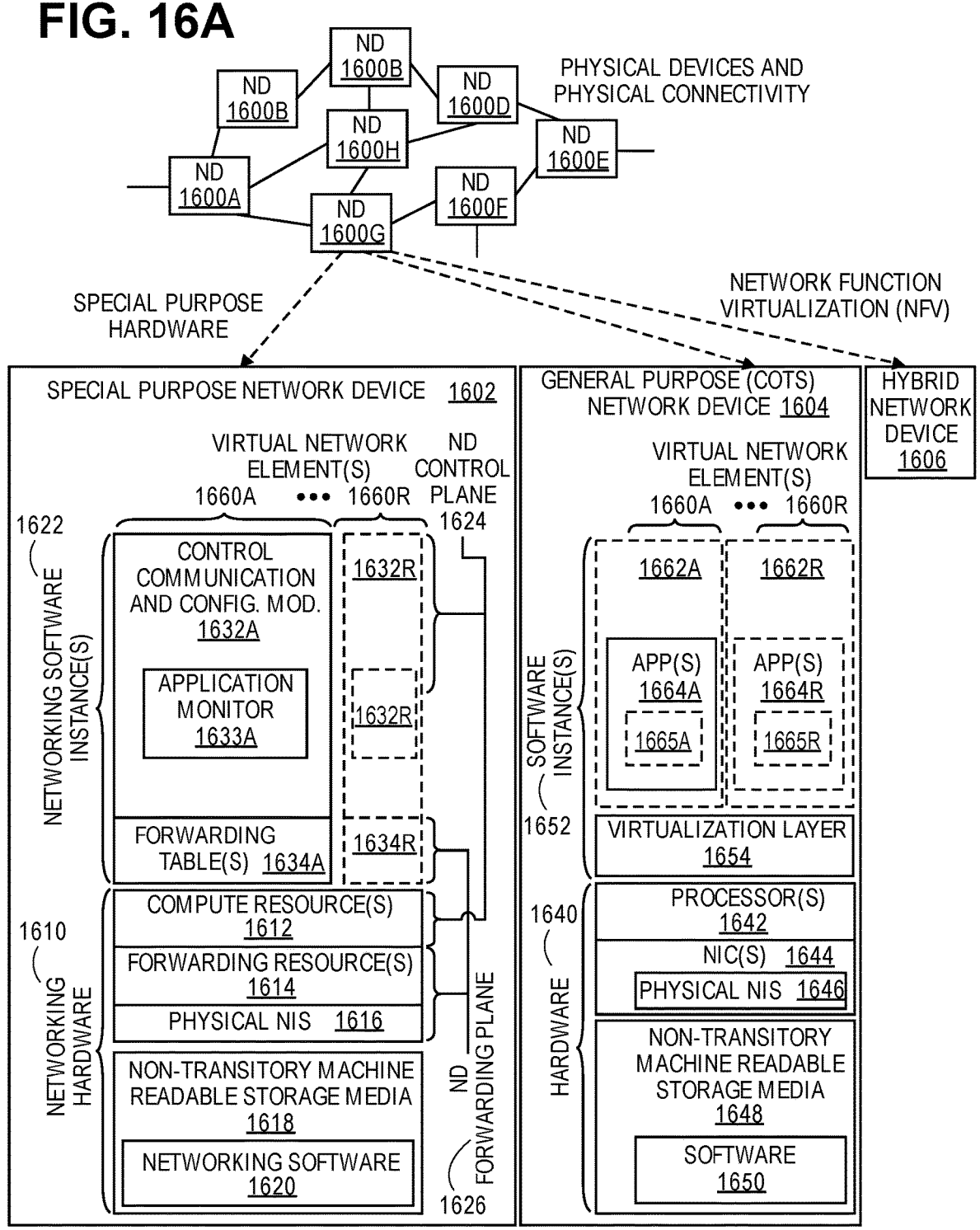
FIG. 16A illustrates connectivity between network devices (NDs) within an exemplary network, as well as three exemplary implementations of the NDs, according to some embodiments of the invention.

FIG. 16A illustrates connectivity between network devices (NDs) within an exemplary network, as well as three exemplary implementations of the NDs, according to some embodiments of the invention. FIG. 16A shows NDs 1600A-H, and their connectivity by way of lines between 1600A-1600B, 1600B-1600C, 1600C-1600D, 1600D-1600E, 1600E-1600F, 1600F-1600G, and 1600A-1600G, as well as between 1600H and each of 1600A, 1600C, 1600D, and 1600G. These NDs are physical devices, and the connectivity between these NDs can be wireless or wired (often referred to as a link). An additional line extending from NDs 1600A, 1600E, and 1600F illustrates that these NDs act as ingress and egress points for the network (and thus, these NDs are sometimes referred to as edge NDs; while the other NDs may be called core NDs).

Two of the exemplary ND implementations in FIG. 16A are: 1) a special-purpose network device 1602 that uses custom application—specific integrated—circuits (ASICs) and a special-purpose operating system (OS); and 2) a general purpose network device 1604 that uses common off-the-shelf (COTS) processors and a standard OS.

The special-purpose network device 1602 includes networking hardware 1610 comprising compute resource(s) 1612 (which typically include a set of one or more processors), forwarding resource(s) 1614 (which typically include one or more ASICs and/or network processors), and physical network interfaces (NIs) 1616 (sometimes called physical ports), as well as non-transitory machine readable storage media 1618 having stored therein networking software 1620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 1600A-H. During operation, the networking software 1620 may be executed by the networking hardware 1610 to instantiate a set of one or more networking software instance(s) 1622. Each of the networking software instance(s) 1622, and that part of the networking hardware 1610 that executes that network software instance (be it hardware dedicated to that networking software instance and/or time slices of hardware temporally shared by that networking software instance with others of the networking software instance(s) 1622), form a separate virtual network element 1630A-R. Each of the virtual network element(s) (VNEs) 1630A-R includes a control communication and configuration module 1632A-R (sometimes referred to as a local control module or control communication module) and forwarding table(s) 1634A-R, such that a given virtual network element (e.g., 1630A) includes the control communication and configuration module (e.g., 1632A), a set of one or more forwarding table(s) (e.g., 1634A), and that portion of the networking hardware 1610 that executes the virtual network element (e.g., 1630A).

In one embodiment, an application monitor 1633A-R implements the processes and functions described herein with regard to monitoring applications at the DPN or controller. The application monitor 1633A-R can include any combination or subset of the functions for sending monitoring requests, collecting statistics, configuring DPNs, byte sequence matching and similar functions described further herein above.

The special-purpose network device 1602 is often physically and/or logically considered to include: 1) a ND control plane 1624 (sometimes referred to as a control plane) comprising the compute resource(s) 1612 that execute the control communication and configuration module(s) 1632A-R; and 2) a ND forwarding plane 1626 (sometimes referred to as a forwarding plane, a data plane, or a media plane) comprising the forwarding resource(s) 1614 that utilize the forwarding table(s) 1634A-R and the physical NIs 1616. By way of example, where the ND is a router (or is implementing routing functionality), the ND control plane 1624 (the compute resource(s) 1612 executing the control communication and configuration module(s) 1632A-R) is typically responsible for participating in controlling how data (e.g., packets) is to be routed (e.g., the next hop for the data and the outgoing physical NI for that data) and storing that routing information in the forwarding table(s) 1634A-R, and the ND forwarding plane 1626 is responsible for receiving that data on the physical NIs 1616 and forwarding that data out the appropriate ones of the physical NIs 1616 based on the forwarding table(s) 1634A-R.

Figure 16B:
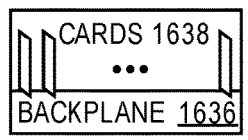
FIG. 16B illustrates an exemplary way to implement a special-purpose network device according to some embodiments of the invention.

FIG. 16B illustrates an exemplary way to implement the special-purpose network device 1602 according to some embodiments of the invention. FIG. 16B shows a special-purpose network device including cards 1638 (typically hot pluggable). While in some embodiments the cards 1638 are of two types (one or more that operate as the ND forwarding plane 1626 (sometimes called line cards), and one or more that operate to implement the ND control plane 1624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1636 (e.g., a first full mesh coupling the line cards and a second full mesh coupling all of the cards).

Returning to FIG. 16A, the general purpose network device 1604 includes hardware 1640 comprising a set of one or more processor(s) 1642 (which are often COTS processors) and network interface controller(s) 1644 (NICs; also known as network interface cards) (which include physical NIs 1646), as well as non-transitory machine readable storage media 1648 having stored therein software 1650. During operation, the processor(s) 1642 execute the software 1650 to instantiate one or more sets of one or more applications 1664A-R. While one embodiment does not implement virtualization, alternative embodiments may use different forms of virtualization. For example, in one such alternative embodiment the virtualization layer 1654 represents the kernel of an operating system (or a shim executing on a base operating system) that allows for the creation of multiple instances 1662A-R called software containers that may each be used to execute one (or more) of the sets of applications 1664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1654 represents a hypervisor (sometimes referred to as a virtual machine monitor (VMM)) or a hypervisor executing on top of a host operating system, and each of the sets of applications 1664A-R is run on top of a guest operating system within an instance 1662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1640, directly on a hypervisor (in which case the unikernel is sometimes described as running within a LibOS virtual machine), or in a software container, embodiments can be implemented fully with unikernels running directly on a hypervisor represented by virtualization layer 1654, unikernels running within software containers represented by instances 1662A-R, or as a combination of unikernels and the above-described techniques (e.g., unikernels and virtual machines both run directly on a hypervisor, unikernels and sets of applications that are run in different software containers).

The instantiation of the one or more sets of one or more applications 1664A-R, as well as virtualization if implemented, are collectively referred to as software instance(s) 1652. Each set of applications 1664A-R, corresponding virtualization construct (e.g., instance 1662A-R) if implemented, and that part of the hardware 1640 that executes them (be it hardware dedicated to that execution and/or time slices of hardware temporally shared), forms a separate virtual network element(s) 1660A-R.

In one embodiment applications 1664A-R may include an application monitor 1665A-R that implements the processes and functions described herein with regard to monitoring applications at the DPN or controller. The application monitor 1665A-R can include any combination or subset of the functions for sending monitoring requests, collecting statistics, configuring DPNs, byte sequence matching and similar functions described further herein above.

The virtual network element(s) 1660A-R perform similar functionality to the virtual network element(s) 1630A-R—e.g., similar to the control communication and configuration module(s) 1632A and forwarding table(s) 1634A (this virtualization of the hardware 1640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1662A-R corresponding to one VNE 1660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1662A-R to VNEs also apply to embodiments where such a finer level of granularity and/or unikernels are used.

In certain embodiments, the virtualization layer 1654 includes a virtual switch that provides similar forwarding services as a physical Ethernet switch. Specifically, this virtual switch forwards traffic between instances 1662A-R and the NIC(s) 1644, as well as optionally between the instances 1662A-R; in addition, this virtual switch may enforce network isolation between the VNEs 1660A-R that by policy are not permitted to communicate with each other (e.g., by honoring virtual local area networks (VLANs)).

The third exemplary ND implementation in FIG. 16A is a hybrid network device 1606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1602) could provide for para-virtualization to the networking hardware present in the hybrid network device 1606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1630A-R, VNEs 1660A-R, and those in the hybrid network device 1606) receives data on the physical NIs (e.g., 1616, 1646) and forwards that data out the appropriate ones of the physical NIs (e.g., 1616, 1646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 16C:
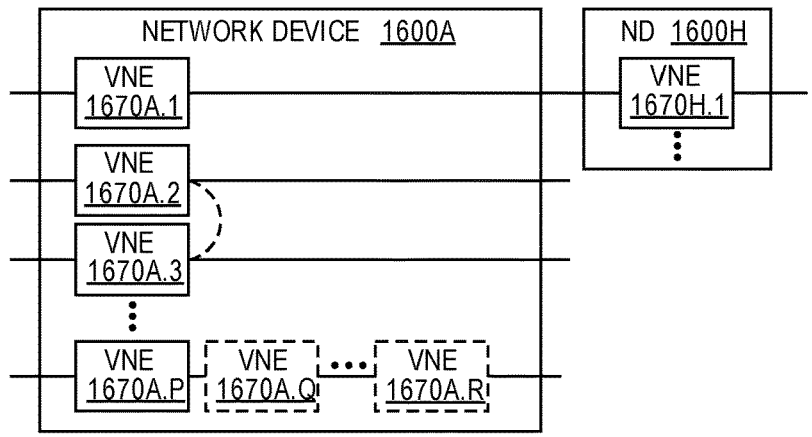
FIG. 16C illustrates various exemplary ways in which virtual network elements (VNEs) may be coupled according to some embodiments of the invention.

FIG. 16C illustrates various exemplary ways in which VNEs may be coupled according to some embodiments of the invention. FIG. 16C shows VNEs 1670A.1-1670A.P (and optionally VNEs 1670A.Q-1670A.R) implemented in ND 1600A and VNE 1670H.1 in ND 1600H. In FIG. 16C, VNEs 1670A.1-P are separate from each other in the sense that they can receive packets from outside ND 1600A and forward packets outside of ND 1600A; VNE 1670A.1 is coupled with VNE 1670H.1, and thus they communicate packets between their respective NDs; VNE 1670A.2-1670A.3 may optionally forward packets between themselves without forwarding them outside of the ND 1600A; and VNE 1670A.P may optionally be the first in a chain of VNEs that includes VNE 1670A.Q followed by VNE 1670A.R (this is sometimes referred to as dynamic service chaining, where each of the VNEs in the series of VNEs provides a different service—e.g., one or more layer 4-7 network services). While FIG. 16C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 16A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 16A may also host one or more such servers (e.g., in the case of the general purpose network device 1604, one or more of the software instances 1662A-R may operate as servers; the same would be true for the hybrid network device 1606; in the case of the special-purpose network device 1602, one or more such servers could also be run on a virtualization layer executed by the compute resource(s) 1612); in which case the servers are said to be co-located with the VNEs of that ND.

A virtual network is a logical abstraction of a physical network (such as that in FIG. 16A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 16D:
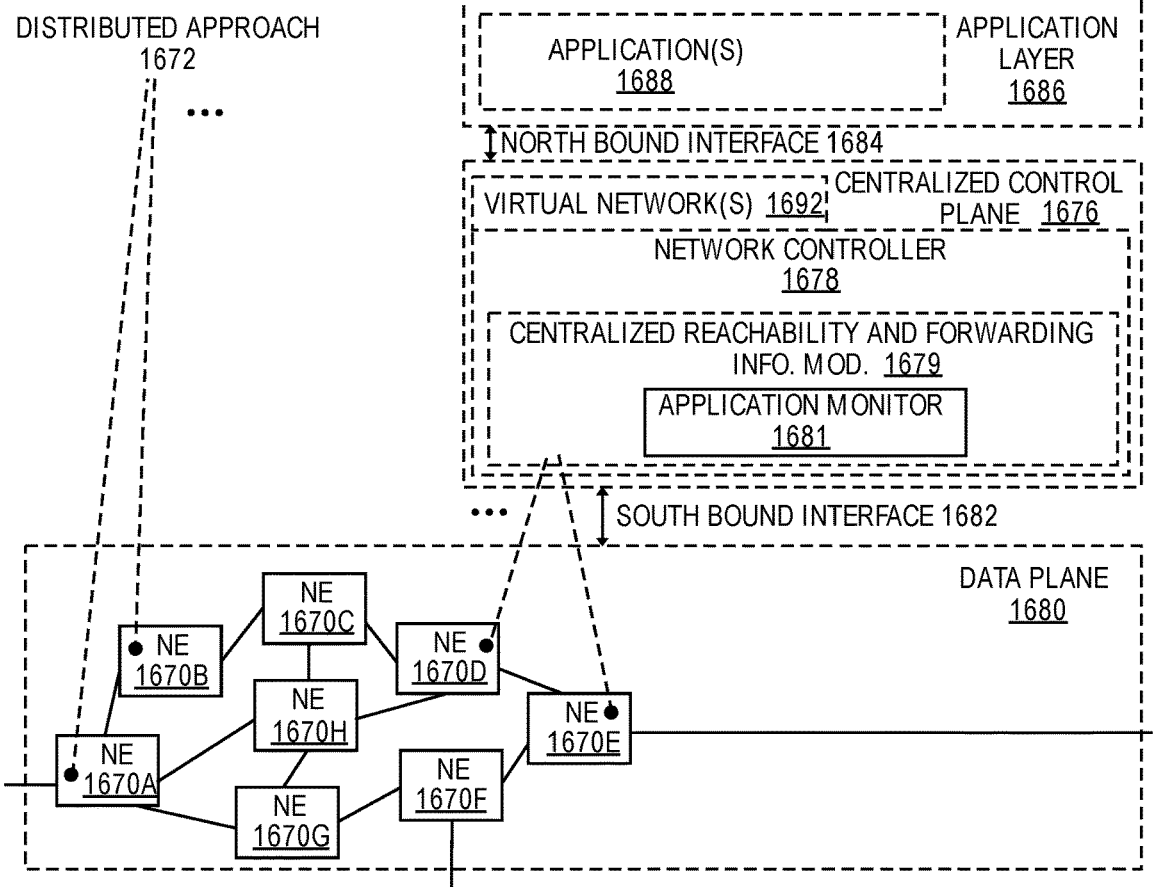
FIG. 16D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 16D illustrates a network with a single network element on each of the NDs of FIG. 16A, and within this straight forward approach contrasts a traditional distributed approach (commonly used by traditional routers) with a centralized approach for maintaining reachability and forwarding information (also called network control), according to some embodiments of the invention. Specifically, FIG. 16D illustrates network elements (NEs) 1670A-H with the same connectivity as the NDs 1600A-H of FIG. 16A.

FIG. 16D illustrates that the distributed approach 1672 distributes responsibility for generating the reachability and forwarding information across the NEs 1670A-H; in other words, the process of neighbor discovery and topology discovery is distributed.

For example, where the special-purpose network device 1602 is used, the control communication and configuration module(s) 1632A-R of the ND control plane 1624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1670A-H (e.g., the compute resource(s) 1612 executing the control communication and configuration module(s) 1632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1624. The ND control plane 1624 programs the ND forwarding plane 1626 with information (e.g., adjacency and route information) based on the routing structure(s). For example, the ND control plane 1624 programs the adjacency and route information into one or more forwarding table(s) 1634A-R (e.g., Forwarding Information Base (FIB), Label Forwarding Information Base (LFIB), and one or more adjacency structures) on the ND forwarding plane 1626. For layer 2 forwarding, the ND can store one or more bridging tables that are used to forward data based on the layer 2 information in that data. While the above example uses the special-purpose network device 1602, the same distributed approach 1672 can be implemented on the general purpose network device 1604 and the hybrid network device 1606.

FIG. 16D illustrates that a centralized approach 1674 (also known as software defined networking (SDN)) that decouples the system that makes decisions about where traffic is sent from the underlying systems that forwards traffic to the selected destination. The illustrated centralized approach 1674 has the responsibility for the generation of reachability and forwarding information in a centralized control plane 1676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1676 has a south bound interface 1682 with a data plane 1680 (sometime referred to the infrastructure layer, network forwarding plane, or forwarding plane (which should not be confused with a ND forwarding plane)) that includes the NEs 1670A-H (sometimes referred to as switches, forwarding elements, data plane elements, or nodes). The centralized control plane 1676 includes a network controller 1678, which includes a centralized reachability and forwarding information module 1679 that determines the reachability within the network and distributes the forwarding information to the NEs 1670A-H of the data plane 1680 over the south bound interface 1682 (which may use the OpenFlow protocol). Thus, the network intelligence is centralized in the centralized control plane 1676 executing on electronic devices that are typically separate from the NDs.

For example, where the special-purpose network device 1602 is used in the data plane 1680, each of the control communication and configuration module(s) 1632A-R of the ND control plane 1624 typically include a control agent that provides the VNE side of the south bound interface 1682. In this case, the ND control plane 1624 (the compute resource(s) 1612 executing the control communication and configuration module(s) 1632A-R) performs its responsibility for participating in controlling how data (e.g., packets) is to be routed (e.g., the next hop for the data and the outgoing physical NI for that data) through the control agent communicating with the centralized control plane 1676 to receive the forwarding information (and in some cases, the reachability information) from the centralized reachability and forwarding information module 1679 (it should be understood that in some embodiments of the invention, the control communication and configuration module(s) 1632A-R, in addition to communicating with the centralized control plane 1676, may also play some role in determining reachability and/or calculating forwarding information—albeit less so than in the case of a distributed approach; such embodiments are generally considered to fall under the centralized approach 1674, but may also be considered a hybrid approach).

In one embodiment applications 1688 or the centralized control plane 1676 may include an application monitor 1681 that implements the processes and functions described herein with regard to monitoring applications at the DPN or controller. The application monitor 1681 can include any combination or subset of the functions for sending monitoring requests, collecting statistics, configuring DPNs, byte sequence matching and similar functions described further herein above.

While the above example uses the special-purpose network device 1602, the same centralized approach 1674 can be implemented with the general purpose network device 1604 (e.g., each of the VNE 1660A-R performs its responsibility for controlling how data (e.g., packets) is to be routed (e.g., the next hop for the data and the outgoing physical NI for that data) by communicating with the centralized control plane 1676 to receive the forwarding information (and in some cases, the reachability information) from the centralized reachability and forwarding information module 1679; it should be understood that in some embodiments of the invention, the VNEs 1660A-R, in addition to communicating with the centralized control plane 1676, may also play some role in determining reachability and/or calculating forwarding information—albeit less so than in the case of a distributed approach) and the hybrid network device 1606. In fact, the use of SDN techniques can enhance the NFV techniques typically used in the general purpose network device 1604 or hybrid network device 1606 implementations as NFV is able to support SDN by providing an infrastructure upon which the SDN software can be run, and NFV and SDN both aim to make use of commodity server hardware and physical switches.

FIG. 16D also shows that the centralized control plane 1676 has a north bound interface 1684 to an application layer 1686, in which resides application(s) 1688. The centralized control plane 1676 has the ability to form virtual networks 1692 (sometimes referred to as a logical forwarding plane, network services, or overlay networks (with the NEs 1670A-H of the data plane 1680 being the underlay network)) for the application(s) 1688. Thus, the centralized control plane 1676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 16D shows the distributed approach 1672 separate from the centralized approach 1674, the effort of network control may be distributed differently or the two combined in certain embodiments of the invention. For example: 1) embodiments may generally use the centralized approach (SDN) 1674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1674, but may also be considered a hybrid approach.

While FIG. 16D illustrates the simple case where each of the NDs 1600A-H implements a single NE 1670A-H, it should be understood that the network control approaches described with reference to FIG. 16D also work for networks where one or more of the NDs 1600A-H implement multiple VNEs (e.g., VNEs 1630A-R, VNEs 1660A-R, those in the hybrid network device 1606). Alternatively or in addition, the network controller 1678 may also emulate the implementation of multiple VNEs in a single ND. Specifically, instead of (or in addition to) implementing multiple VNEs in a single ND, the network controller 1678 may present the implementation of a VNE/NE in a single ND as multiple VNEs in the virtual networks 1692 (all in the same one of the virtual network(s) 1692, each in different ones of the virtual network(s) 1692, or some combination). For example, the network controller 1678 may cause an ND to implement a single VNE (a NE) in the underlay network, and then logically divide up the resources of that NE within the centralized control plane 1676 to present different VNEs in the virtual network(s) 1692 (where these different VNEs in the overlay networks are sharing the resources of the single VNE/NE implementation on the ND in the underlay network).

Figure 16E:
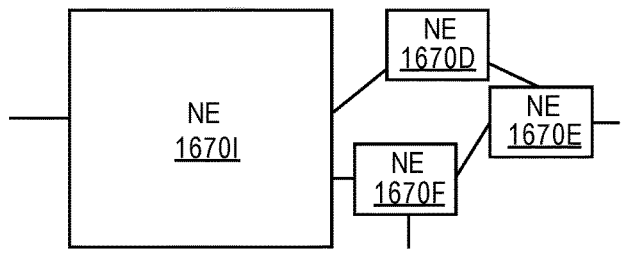
FIG. 16E illustrates the simple case of where each of the NDs implements a single NE, but a centralized control plane has abstracted multiple of the NEs in different NDs into (to represent) a single NE in one of the virtual network(s), according to some embodiments of the invention.
Figure 16F:
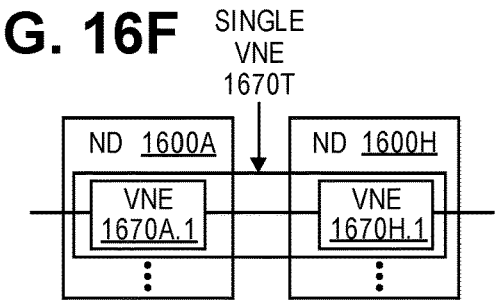
FIG. 16F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 16E and 16F respectively illustrate exemplary abstractions of NEs and VNEs that the network controller 1678 may present as part of different ones of the virtual networks 1692. FIG. 16E illustrates the simple case of where each of the NDs 1600A-H implements a single NE 1670A-H (see FIG. 16D), but the centralized control plane 1676 has abstracted multiple of the NEs in different NDs (the NEs 1670A-C and G-H) into (to represent) a single NE 1670I in one of the virtual network(s) 1692 of FIG. 16D, according to some embodiments of the invention. FIG. 16E shows that in this virtual network, the NE 1670I is coupled to NE 1670D and 1670F, which are both still coupled to NE 1670E.

FIG. 16F illustrates a case where multiple VNEs (VNE 1670A.1 and VNE 1670H.1) are implemented on different NDs (ND 1600A and ND 1600H) and are coupled to each other, and where the centralized control plane 1676 has abstracted these multiple VNEs such that they appear as a single VNE 1670T within one of the virtual networks 1692 of FIG. 16D, according to some embodiments of the invention. Thus, the abstraction of a NE or VNE can span multiple NDs.

While some embodiments of the invention implement the centralized control plane 1676 as a single entity (e.g., a single instance of software running on a single electronic device), alternative embodiments may spread the functionality across multiple entities for redundancy and/or scalability purposes (e.g., multiple instances of software running on different electronic devices).

Figure 17:
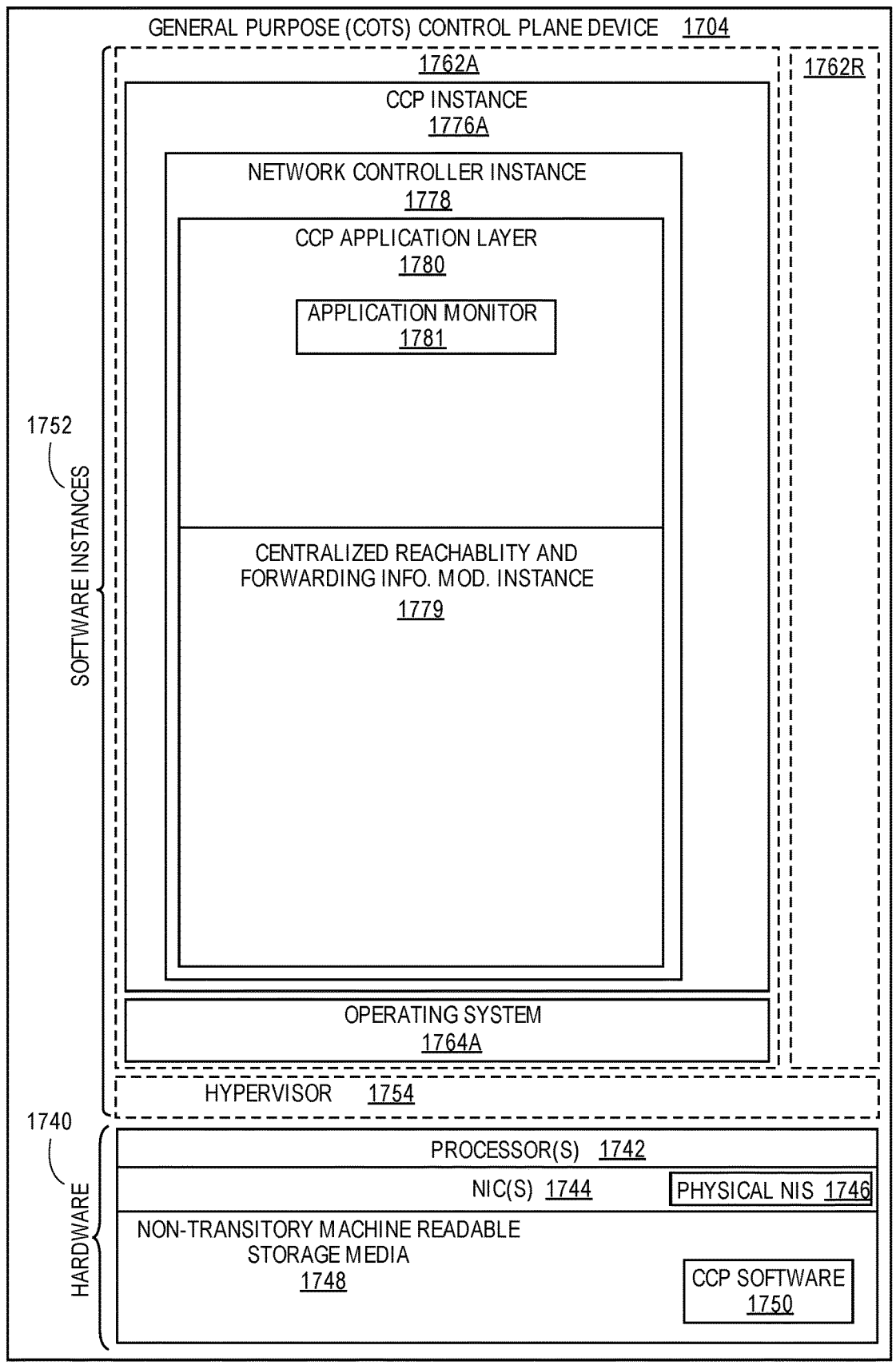
FIG. 17 illustrates a general purpose control plane device with centralized control plane (CCP) software 1750), according to some embodiments of the invention.

Similar to the network device implementations, the electronic device(s) running the centralized control plane 1676, and thus the network controller 1678 including the centralized reachability and forwarding information module 1679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 17 illustrates, a general purpose control plane device 1704 including hardware 1740 comprising a set of one or more processor(s) 1742 (which are often COTS processors) and network interface controller(s) 1744 (NICs; also known as network interface cards) (which include physical NIs 1746), as well as non-transitory machine readable storage media 1748 having stored therein centralized control plane (CCP) software 1750.

In embodiments that use compute virtualization, the processor(s) 1742 typically execute software to instantiate a virtualization layer 1754 (e.g., in one embodiment the virtualization layer 1754 represents the kernel of an operating system (or a shim executing on a base operating system) that allows for the creation of multiple instances 1762A-R called software containers (representing separate user spaces and also called virtualization engines, virtual private servers, or jails) that may each be used to execute a set of one or more applications; in another embodiment the virtualization layer 1754 represents a hypervisor (sometimes referred to as a virtual machine monitor (VMM)) or a hypervisor executing on top of a host operating system, and an application is run on top of a guest operating system within an instance 1762A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1740, directly on a hypervisor represented by virtualization layer 1754 (in which case the unikernel is sometimes described as running within a LibOS virtual machine), or in a software container represented by one of instances 1762A-R). Again, in embodiments where compute virtualization is used, during operation an instance of the CCP software 1750 (illustrated as CCP instance 1776A) is executed (e.g., within the instance 1762A) on the virtualization layer 1754. In embodiments where compute virtualization is not used, the CCP instance 1776A is executed, as a unikernel or on top of a host operating system, on the "bare metal" general purpose control plane device 1704. The instantiation of the CCP instance 1776A, as well as the virtualization layer 1754 and instances 1762A-R if implemented, are collectively referred to as software instance(s) 1752.

In some embodiments, the CCP instance 1776A includes a network controller instance 1778. The network controller instance 1778 includes a centralized reachability and forwarding information module instance 1779 (which is a middleware layer providing the context of the network controller 1678 to the operating system and communicating with the various NEs), and an CCP application layer 1780 (sometimes referred to as an application layer) over the middleware layer (providing the intelligence required for various network operations such as protocols, network situational awareness, and user—interfaces). At a more abstract level, this CCP application layer 1780 within the centralized control plane 1676 works with virtual network view(s) (logical view(s) of the network) and the middleware layer provides the conversion from the virtual networks to the physical view.

In one embodiment, the CCP application layer may include an application monitor 1681 that implements the processes and functions described herein with regard to monitoring applications at the DPN or controller. The application monitor 1681 can include any combination or subset of the functions for sending monitoring requests, collecting statistics, configuring DPNs, byte sequence matching and similar functions described further herein above.

The centralized control plane 1676 transmits relevant messages to the data plane 1680 based on CCP application layer 1780 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 1680 may receive different messages, and thus different forwarding information. The data plane 1680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1680, the packet (or a subset of the packet header and content) is typically forwarded to the centralized control plane 1676. The centralized control plane 1676 will then program forwarding table entries into the data plane 1680 to accommodate packets belonging to the flow of the unknown packet. Once a specific forwarding table entry has been programmed into the data plane 1680 by the centralized control plane 1676, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device to reduce bandwidth and compute resources needed by a controller of a software defined networking (SDN) controller by distributing monitoring of virtual network functions (VNFs) to data plane nodes (DPNs) in a SDN network, the method comprising:

receiving a monitoring request from the SDN controller to monitor a VNF;

receiving a byte sequence from the SDN controller for the VNF;

determining whether a monitoring response message from the VNF matches the byte sequence at a given offset, wherein the given offset indicates a location in the monitoring response message from where the matching between the monitoring response message and the byte sequence starts;

generating entries for monitoring the VNF by matching the byte sequence with monitoring response messages from the VNF, sending a monitoring request message to a malfunctioning VNF;

receiving an unexpected response from the malfunctioning VNF or determining that a response to the monitoring request message has timed out, and sending the unexpected response or a notification of timeout to the SDN controller.

2. The method of claim 1, further comprising:
sending the monitoring response message to the controller.

3. The method of claim 1, wherein the byte sequence is determined from a pattern in response monitoring response messages from the VNF.

4. The method of claim 1, further comprising:
sending a monitoring response message to the controller where the byte sequence is unmatched.

5. The method of claim 1, wherein the matching is specified using an offset-from-end field, and wherein the offset-from-end field specifies whether the given offset should be calculated from beginning of the monitoring response message or from end of the monitoring response message.

6. A network device configured to execute a method to reduce bandwidth and compute resources needed by a controller of a software defined networking (SDN) controller by distributing monitoring of virtual network functions (VNFs) to data plane nodes (DPNs) in a SDN network, the network device comprising:

a non-transitory computer-readable medium having stored therein an application monitor; and a processor coupled to the non-transitory computer-readable medium, the processor to execute the application monitor, the application monitor to receive a monitoring request from the SDN controller to monitor a VNF, to receive a byte sequence from the SDN controller for the VNF, to determine whether a monitoring response message from the VNF matches the byte sequence at a given offset, wherein the given offset indicates a location in the monitoring response message from where the matching between the monitoring response message and the byte sequence starts, to generate flow table entries for monitoring the VNF by matching the byte sequence with monitoring response messages from the VNF, to send a monitoring request message to a malfunctioning VNF, to receive an unexpected response from the malfunctioning VNF or determine that a response to the monitoring request message has timed out, and to send the unexpected response or a notification of timeout to the SDN controller.

7. The network device of claim 6, wherein the application monitor is further to send the monitoring response message to the controller.

8. The network device of claim 6, wherein the byte sequence is determined from a pattern in response monitoring response messages from the VNF.

9. The network device of claim 6, wherein the application monitor is further to send monitoring response message to the controller where the byte sequence is unmatched.

10. A computing device functioning as a network node, the computing device to execute a plurality of virtual machines for implementing network function virtualization, wherein a virtual machine from the plurality of virtual machines is configured to execute a method to reduce bandwidth and compute resources needed by a controller of a software defined networking (SDN) controller by distributing monitoring of virtual network functions (VNFs) to data plane nodes (DPNs) in a SDN network, the computing device comprising:

a non-transitory computer-readable medium having stored therein an application monitor; and a processor coupled to the non-transitory computer-readable medium, the processor to execute the virtual machine from the plurality of virtual machines, the virtual machine to execute the application monitor, the application monitor to receive a monitoring request from the SDN controller to monitor a VNF, to receive a byte sequence from the SDN controller for the VNF, to determine whether a monitoring response message from the VNF matches the byte sequence at a given offset, wherein the given offset indicates a location in the monitoring response message from where the matching between the monitoring response message and the byte sequence starts, and to generate flow table entries for monitoring the VNF by matching the byte sequence with monitoring response messages from the VNF, wherein when a response request is sent to a malfunctioning VNF, the application monitor to receive an unexpected response from the malfunctioning VNF or determine that the response request has timed out, and to send the unexpected response or a notification of timeout to the SDN controller.

11. The computing device of claim 10, wherein the application monitor is further to send the monitoring response message to the controller.

12. The computing device of claim 10, wherein the byte sequence is determined from a pattern in response monitoring response messages from the VNF.

13. The computing device of claim 10, wherein the application monitor is further to send monitoring response message to the controller where the byte sequence is unmatched.

14. A control plane device to implement a control plane of a software defined networking (SDN) network including a plurality of network devices implementing a data plane of the SDN network, the control plane device configured to execute a method to reduce bandwidth and compute resources needed by a controller of a software defined networking (SDN) controller by distributing monitoring of virtual network functions (VNFs) to data plane nodes (DPNs) in a SDN network, the control plane device comprising:
- a non-transitory computer-readable medium having stored therein an application monitor; and
- a processor coupled to the non-transitory computer-readable medium, the processor to execute the application monitor,
the application monitor
- to send an initial monitoring request for a VNF to a data plane node (DPN),
- to receive a monitoring response message from the DPN,
- to determine whether an offset for a byte sequence and to send the offset to the DPN,
- to send the byte sequence to the DPN for the VNF to enable the DPN to identify monitoring response messages from the VNF to forward to the application monitor, wherein the identification of the monitoring response messages is based on matching of the monitoring response messages with the byte sequence, and wherein the offset indicates a location in the monitoring response message from where the matching between the monitoring response message and the byte sequence starts, and
- to receive an unexpected response or a notification of timeout from the DPN when the DPN receives the unexpected response from a malfunctioning VNF or the response from the malfunctioning VNF times out.

15. The control plane device of claim 14, wherein the application monitor is further to analyze the monitoring response message to determine the byte sequence.

16. The control plane device of claim 14, wherein the application monitor is further to record data related to the monitoring response message from the VNF.

17. The control plane device of claim 14, wherein the application monitor is further to receive the monitoring response message from the DPN where the byte sequence is unmatched.

\* \* \* \* \*